(12) United States Patent  
Teraoka

(10) Patent No.: US 7,296,644 B2
(45) Date of Patent: Nov. 20, 2007

(54) REDUCTION-DRIVE DEVICE

(75) Inventor: Masao Teraoka, Tochigi (JP)

(73) Assignee: Tochigi Fuji Sangyo Kabushiki Kaisha, Tochigi-Ken (JP)

( * ) Notice: Subject to any disclaimer, the term of this patent is extended or adjusted under 35 U.S.C. 154(b) by 372 days.

(21) Appl. No.: 10/887,205

(22) Filed: Jul. 8, 2004

(65) Prior Publication Data

US 2005/0006164 A1    Jan. 13, 2005

(30) Foreign Application Priority Data

Jul. 9, 2003    (JP) .......................... P. 2003-272550
Sep. 2, 2003    (JP) .......................... P. 2003-309831

(51) Int. Cl.
   *B60K 6/04*    (2006.01)
(52) U.S. Cl. ...................... 180/65.2; 180/378
(58) Field of Classification Search ............... 180/65.1, 180/65.2, 65.6, 378, 379, 233, 242, 243
   See application file for complete search history.

(56) References Cited

U.S. PATENT DOCUMENTS

| 6,302,227 | B1 * | 10/2001 | Takemura et al. ......... 180/65.2 |
| 6,334,498 | B1 * | 1/2002  | Morisawa et al. ......... 180/65.2 |
| 6,549,840 | B1 * | 4/2003  | Mikami et al. ............ 701/69 |
| 6,557,656 | B2 * | 5/2003  | Haniu et al. ............. 180/65.6 |
| 6,902,018 | B2 * | 6/2005  | Hisada et al. ............ 180/65.1 |
| 6,931,318 | B2 * | 8/2005  | Kaita et al. .............. 701/113 |
| 6,966,866 | B2 * | 11/2005 | Ando et al. .............. 477/4 |
| 7,079,942 | B2 * | 7/2006  | McGee et al. ............ 701/113 |
| 7,086,978 | B2 * | 8/2006  | Aikawa et al. ........... 475/5 |
| 7,100,721 | B2 * | 9/2006  | Atarashi et al. ......... 180/65.2 |
| 7,108,088 | B2 * | 9/2006  | Muta ...................... 180/65.2 |

FOREIGN PATENT DOCUMENTS

| DE | 195 05 278.1 A1 | 8/1995 |
| DE | 101 51 713.0 A1 | 7/2002 |
| JP | 2001-287550     | 10/2001 |
| JP | 2003-104073     | 4/2003 |

OTHER PUBLICATIONS

German Office Action issued in German Application No. 10 2004 033 396.3-14 mailed on Jul. 18, 2006 and English translation thereof, 5 pages.

* cited by examiner

*Primary Examiner*—Christopher P. Ellis
*Assistant Examiner*—Brian Swenson
(74) *Attorney, Agent, or Firm*—Osha Liang LLP

(57) ABSTRACT

A reduction-drive device has a first and a second reduction mechanism and distribution device. The first reduction mechanism has a planetary carrier, a planetary gear rotatably supported by the planetary carrier, an internal gear in mesh with the planetary gear and a sun gear. The first reduction mechanism is supported by the housing so as to reduce driving force of the electric motor. The second reduction mechanism is positioned between the electric motor and the first reduction mechanism so as to reduce an output of the first reduction mechanism. The differential device is supported by the housing so as to distribute the output of the second reduction mechanism to a wheel side.

22 Claims, 13 Drawing Sheets

REDUCTION-DRIVE DEVICE

BACKGROUND OF THE INVENTION

The present invention relates to a reduction-drive device used to such as a four wheel drive automobile.

As a conventional reduction-drive device, there is, for example, a device as shown in FIG. 15. The reduction-drive device 201 of FIG. 15 reduces an output of an electric motor 203 to transmit to left and right axle shafts and drive the left and right rear wheels. The electric motor 203 is served as a sub-drive source, and at a side of front wheels, an engine is served as a main drive source, and the left and right front wheels are driven by the engine.

The motor reduction-drive device 201 rotatably supports a first transmission shaft 207, that receives an output of the electric motor 203, at a housing 205 of a stationary side. The first transmission shaft 207 has a reduction gear 211 composing a first reduction mechanism 209. The reduction gear 211 is in mesh with another reduction gear 213 composing the first reduction mechanism 209. The reduction gear 213 is provided to a second transmission shaft 215. The second transmission shaft 215 is disposed in parallel to the first transmission shaft 207, and is rotatably supported to the housing 205.

The second transmission shaft 215 is provided with a reduction gear 219 composing a second reduction mechanism 217. The reduction gear 219 is in mesh with another reduction gear 221 of the second reduction mechanism 217. The reduction gear 221 of the second reduction mechanism 217 is provided to a third transmission shaft 223. The third transmission shaft 223 is disposed in parallel to the first and second transmission shafts 207, 213 and is rotatably supported to the housing 205.

The third transmission shaft 223 is provided with a reduction gear 227 composing a third reduction mechanism 225. The reduction gear 227 is in mesh with a ring gear 229 as another reduction gear of the third reduction mechanism 225. The ring gear 229 is provided to a rear differential 231 as a differential device. A rotating shaft of the rear differential 231 is disposed in parallel to the first, second, third transmission shafts 209, 215, 223. The rear differential 231 is connected in interlocking with the left and right rear wheels via axle shafts.

Accordingly, by driving of the electric motor 203, the first transmission shaft 207 is driven to transmit torque to the second transmission shaft 215 via the first reduction mechanism 209. From the second transmission shaft 215, via the second reduction mechanism 217, the torque is transmitted to the third transmission shaft 223, and is transmitted to the rear differential 231 via the third reduction mechanism 225. From the rear differential 231, via the left and right axle shafts, the torque is transmitted to the left and right rear wheels, and the left and right rear wheels are driven by the electric motor 203.

The front wheel side is driven by the engine as the main drive source. Therefore, it is possible to travel as a hybrid automobile of a four wheel drive.

Further, as the conventional reduction-drive device, there is also a device as shown in FIG. 16. In the same, for simplifying explanation, the composing parts corresponding to those of FIG. 15 will be given the same reference numerals. In the motor reduction-drive device 201A of FIG. 16, the first transmission shaft 207 and the second transmission shaft 215 are coaxially disposed, and the first reduction mechanism 209A is composed with a planet gear mechanism.

Therefore, the output of the electric motor 203 is transmitted to the first transmission shaft 207, reduced at the first reduction 209A, and transmitted to the second transmission shaft 215. The torque transmission after the second transmission shaft 215 is the same as the case of FIG. 15.

However, since the first reduction mechanism 209 and 209A is installed near the electric motor 203, an attaching error of the electric motor 203 gives a direct influence to the first reduction mechanism 209 and 209A, and improvements of acoustic vibration or durability have been limited owing to occurrences of vibration or abnormal sound in the first reduction mechanism 209 and 209A (see, for example, JP-A-2001-287550).

Furthermore, as a conventional reduction-drive device, there is, for example, a device as shown in FIG. 14 (see, for example, JP-A-2003-104073). The motor reduction-drive device 1201 of FIG. 14 reduces an output of an electric motor to transmit to left and right axle shafts and drive, left and right rear wheels. The electric motor is served as a sub-drive source. At a side of front wheels, an engine such as an internal combustion is served as a main drive source, and the left and right front wheels are driven by the engine.

The reduction-drive device 1201 rotatably supports a first transmission shaft 1207 at a housing 1205 of a stationary side. The first transmission shaft 1207 has a reduction gear 1211 composing a first reduction mechanism 1209. The reduction gear 1211 is in mesh with another reduction gear 1215 of the first reduction mechanism 1209. The reduction gear 1215 is supported by a second transmission shaft 1217. The second transmission shaft 1217 is disposed in parallel to the first transmission shaft 1207, and is rotatably supported to the housing 1205.

The second transmission shaft 1217 is provided with a reduction gear 1221 composing a second reduction mechanism 1219. The reduction gear 1221 is in mesh with another reduction gear 1223 of the second reduction mechanism 1219. The reduction gear 1223 is rotatably supported relatively to a differential case 1227 of a rear differential device 1225 via a bearing 1229.

The rear differential device 1225 supports a differential gear mechanism 1231 within the differential case 1227. The differential case 1229 is rotatably supported to the housing 1205 by the bearing 1233.

Transmission and break of torque between the reduction gear 1223 and the differential case 1229 is performed by an electromagnetic clutch 1235 using multi frictional plates.

Accordingly, in case the electromagnetic clutch 1235 is under a torque transmitting condition, if driving an electric motor, a torque reduced through a first and second reduction mechanisms 1209, 1219 is transmitted to a rear differential device 1225. From the rear differential device 1225, the torque is transmitted to left and right axle shafts. By this torque, driving of an engine is helped when starting travel or ascending travel.

When the electric motor is at rest, the electromagnetic clutch 1235 is switched to a torque cutting off condition. Even if, under this switching condition, rotation at the wheel side is transmitted to the rear differential device 1225, the rotation is never transmitted to the first, second reduction mechanisms 1209, 1219 and the electric motor. Therefore, when an output of the electric motor is stopped, the first, second reduction mechanisms 1209, 1219 and the electric motor are never forcibly rotated by the rotation of the wheel side.

For getting high output in the reduction-drive device 1201, this can be in general accomplished by enlarging a scale of the electric motor.

However, there has been a problem that if building such a structure of merely carrying out the high reduction by the first and second reduction mechanisms 1209, 1219, abnormal noises easily occur in the reduction gears 1211, 1215 or the reduction gears 1221, 1223.

SUMMARY OF THE INVENTION

It is an object of the invention to accomplish more improve the sound oscillating performance and the durability with less influences by attaching errors of the electric motor, decrease occurrences of vibrations or abnormal noises, and to improve the sound oscillating performance and the durability.

In order to achieve the object, a reduction-drive device according to the present invention comprises a driving source including a transmission shaft; a housing; a first reduction mechanism supported by the housing, for reducing a driving force of the driving source, including a planetary carrier, a planetary gear rotatably supported by the planetary carrier, an internal gear in mesh with the planetary gear, and a sun gear in mesh with the planetary gear; a second reduction mechanism positioned between the driving source and the first reduction mechanism with respect to an axial direction of the transmission shaft, for reducing an output of the first reduction mechanism; and a distribution device supported by the housing, for distributing an output of the second reduction mechanism to a pair of axle shafts.

In the reduction-drive device, the second reduction mechanism may comprise a reduction gear provided on an output side of the first reduction mechanism, and a ring gear provided on a side of the distribution device.

In the reduction-drive device, the reduction gear and the ring gear may be brought in mesh at an inner position with respect to an outermost portion of the first reduction mechanism in a radial direction.

In the reduction-drive device, the transmission shaft may be connected to the sun gear.

In the reduction-drive device, the planetary carrier may be relatively rotatable with respect to the housing, the internal gear is relatively unrotatable with respect to the housing, and the second reduction mechanism may comprise a reduction gear rotating together with the planetary carrier, and a ring gear, provided on a side of the distribution device, in mesh with the reduction gear.

In the reduction-drive device, the planetary carrier may be relatively unrotatable with respect to the housing, the internal gear is relatively rotatable with respect to the housing, and the second reduction mechanism may comprise a reduction gear rotating together with the internal gear, and a ring gear, provided on a side of the distribution device, in mesh with the reduction gear.

In the reduction-drive device, the planetary gear may comprise plural stepped gears including at least a gear in mesh with the sun gear, and a gear in mesh with the internal gear.

In the reduction-drive device, the planetary gear may comprise a first stepped gear in mesh with the sun gear, and a second stepped gear in mesh with the internal gear.

In the reduction-drive device, the driving source may comprise an electric motor.

In the reduction-drive device, the driving source may be mounted on an automobile having a main driving source for driving one of front and rear wheels, and a sub-driving source for driving the other of the front and rear wheels, and the driving source is the sub-driving source.

In the reduction-drive device, the main driving source may be an internal combustion engine, and the sub-driving source is an electric motor.

In the reduction-drive device, an output shaft of the first reduction mechanism may be coaxially disposed with the transmission shaft and outer side of the transmission shaft.

In the reduction-drive device, the housing may comprise at least a first housing including a first side wall and a second housing including a second side wall, one side of the planetary carrier may be supported by the first housing, and the driving source may be supported by the second housing.

In the reduction-drive device, the one side of the planetary carrier may be rotatably supported by the first side wall via a bearing.

In the reduction-drive device, the other side of the planetary carrier may be supported by the second housing.

The reduction-drive device may further comprise a carrier pin, and the planetary carrier may be unrotatably supported by the first side wall via the carrier pin.

In the reduction-drive device, one of the sun gear and the transmission shaft may be supported by the planetary carrier.

In the reduction-drive device, the second reduction mechanism may comprise a pinion gear provided on an outer side of the first reduction mechanism and a ring gear provided on the distribution device.

The reduction-drive device may further comprise a clutch mechanism provided in a transmission path from the transmission shaft to the axle shaft.

In the reduction-drive device, wherein the distributing device may include a clutch mechanism positioned between the second reduction mechanism and the axle shaft. In the reduction-drive device, wherein a axis of the clutch mechanism may be disposed in parallel with the transmission shaft, and the clutch mechanism and the driving source may be partially overlapped with respect to the axial direction. The reduction-drive device may further comprise a clutch mechanism provided between the first reduction mechanism and the second reduction mechanism.

The reduction-drive device may further comprise a clutch mechanism provided between the distribution device and the axle shaft.

Since the second reduction mechanism is disposed between the electric motor and the first reduction mechanism so as to separate the first reduction mechanism from the electric motor, taking a distance, an error in setting-up of the electric motor may be restrained from effecting to the first reduction mechanism, and it is possible to suppress occurrences of vibrations or abnormal sounds in the first reduction mechanism, and to improve performance of acoustic vibration or durability.

Furthermore, the second reduction mechanism is easily disposed between the electric motor and the first reduction mechanism, and it is possible to reduce the driving force of the electric motor by the first reduction mechanism and transmit the driving force reduced from the planetary carrier of the first reduction mechanism to the second reduction mechanism. The driving force can be further reduced by the reduction gear of the second reduction mechanism and the ring gear, and can be certainly transmitted to the differential device.

Further, the sub-drive source may be reduced in size and in weight. Further, it is possible to improve the sound oscillating performance of the sub-drive source as well as the durability.

Further, it is possible to reduce in size and weight of the motor reduction-drive device of transmitting the driving force to one of the front and rear wheels, and the other drives the other wheel, in the hybrid automobile. Further, it is possible to improve the sound oscillating performance as well as the durability.

In addition, the reduction-drive device can transmit rotating output at high speed of the drive source to the sun gear, and transmit, at reduction speed, high speed rotation of the sun gear from the internal gear via the planetary gear rotatably supported at the carrier provided as one body or integrally to the housing. Accordingly, while enabling the high reduction, it is less to invite occurrence of abnormal noises when gearing owing to improvement of supporting rigidity. Further, since the high speed rotation of the drive source is changed to the high reduction, the high output or the high rotation can be obtained though not making the drive source large scaled, and the heavy weight can be restrained.

Although the sun gear and the output shaft of the drive source more or less deviate from the core by such as an attaching error, this deviation can be absorbed by deflection of the transmission shaft extending till the side of the drive source. Therefore, the engagement between the sun gear and the planetary gear can be steadily performed, enabling to more certainly restrain abnormal noises.

The high speed rotation of the drive source can be reduced in the plural steps between the sun gear and the internal gear, and the drive source can be made smaller in size.

Since the drive source is the sub-drive source with respect to the other main drive source, the sub-drive source may be formed to be small in size and light in weight.

Since the main drive source is the internal combustion engine, and the sub-drive source is the electric motor, and one of the internal combustion engine and the electric motor drives one of the front wheels and the rear wheels, and the other drives the other wheels, it is possible to make small in size and light in weight the reduction-drive device of transmitting drive power force to one of the front wheels and the rear wheels in the four wheel drive automobile.

DESCRIPTION OF THE PREFERRED EMBODIMENTS

First Embodiment

Figure 1:
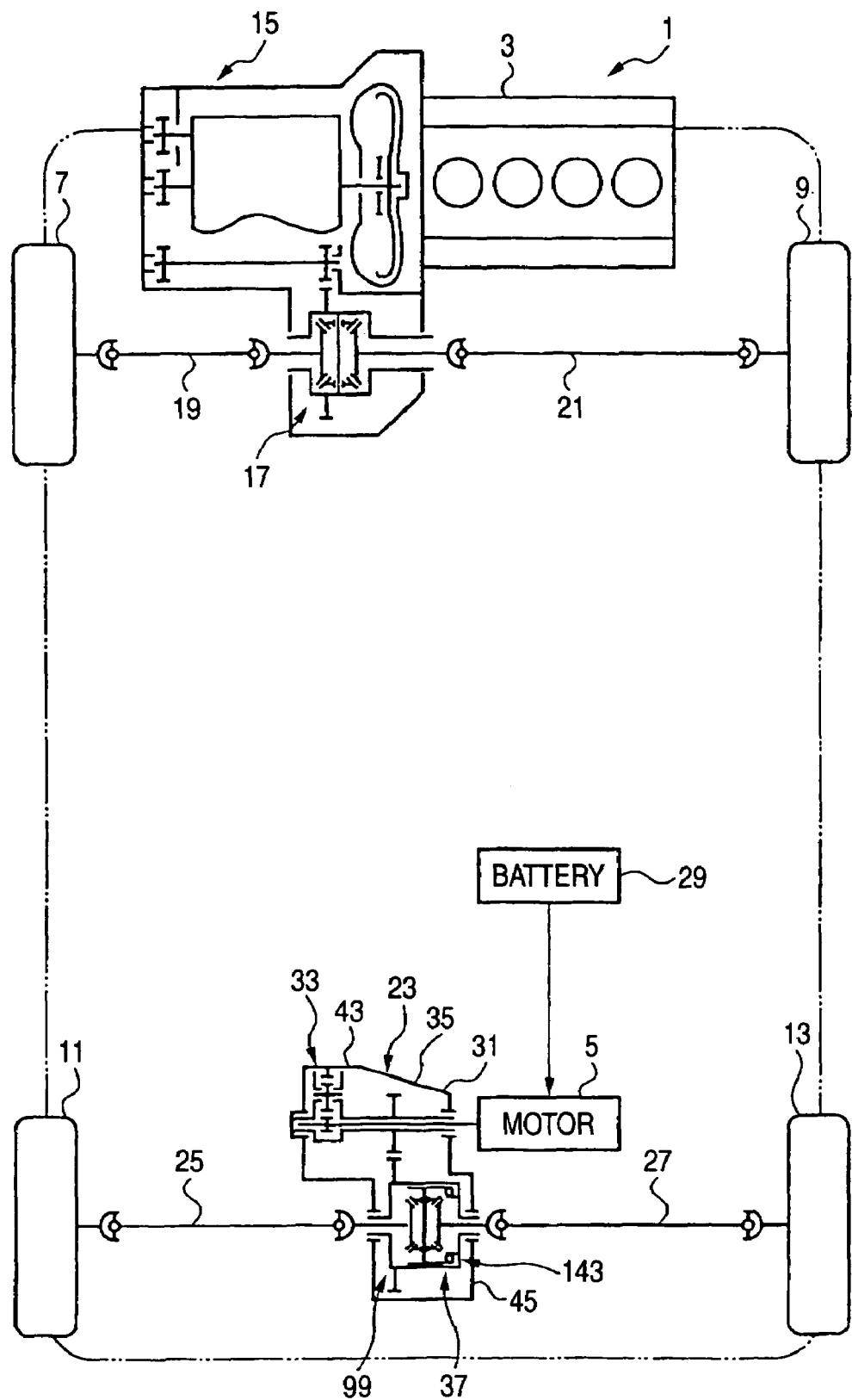
FIG. 1 is a skeleton plan view of the hybrid automobile in which a reduction-drive device according to a first embodiment of the invention is applied.

FIG. 1 is a skeleton plan view of the hybrid automobile applied with the motor reduction-drive device according to the first embodiment of the invention. As seeing FIG. 1, the hybrid automobile 1 has the engine 3 as the main drive source and the electric motor 5 as the sub-drive source. In the first embodiment, the engine 3 is the drive source for driving the left and right front wheels 7, 9, while the electric motor 5 is the drive source for driving the left and right rear wheels 11, 13. It is also possible to drive the front wheels by the electric motor 5 of the sub-drive source, and drive the rear wheels 11, 13 by the engine 3 of the main drive source.

The output of the engine 3 is issued into a front differential 17 as the differential device via a transmission 15. To the front differential 17, via left and right axle shafts 19, 21, the front wheels 7, 9 are connected in interlocking.

The output of the electric motor 5 is issued into the motor reduction-drive device 23. To the outputting side of the motor reduction-drive device 23, via the left and right axle shafts 25, 27, the left and right rear wheels 11, 13 are connected in interlocking.

The electric motor 5 is supplied with current from a battery 29. The electric motor 5 is supplied with current by a generator (not shown) generated when the engine 3 rotates to output, and when reducing speed of the automobile, the electric generation of the generator is charged in the battery 29.

Accordingly, while traveling, torque is ordinarily transmitted to the front differential 17 via the transmission 15 by driving of the engine 3. From the front differential 17, via the left and right axle shafts 19, 21, the torque is transmitted to the left and right front wheels 7, 9.

Further, by the electric generation of the generator by rotation of the engine 3, the electric motor 5 is supplied with current, and the output of the electric motor 5 is transmitted to the motor reduction-drive device 23 from which, via the left and right axle shafts 25, 27, the torque is transmitted to the left and right rear wheels 11, 13.

Therefore, the hybrid automobile 1 can travel under the four wheel driving condition, by driving of the front wheels 7, 9 by the engine 3 and auxiliary driving of the rear wheels 11, 13 by the electric motor 5.

When starting and accelerating to travel, the electric power supply is added to the electric motor 5 from the battery 29, and smooth starting and accelerating are possible. When reducing the speed of the automobile, the battery 29 is charged with electric power by the generator to make preparation for subsequent starting and accelerating.

Further, as the other example, the automobile 1 may be driven without using a battery 29 but using an alternator generator provided on the engine 3 so that the electric power may be directly supplied from the alternator generator to the electric motor 3.

Figure 2:
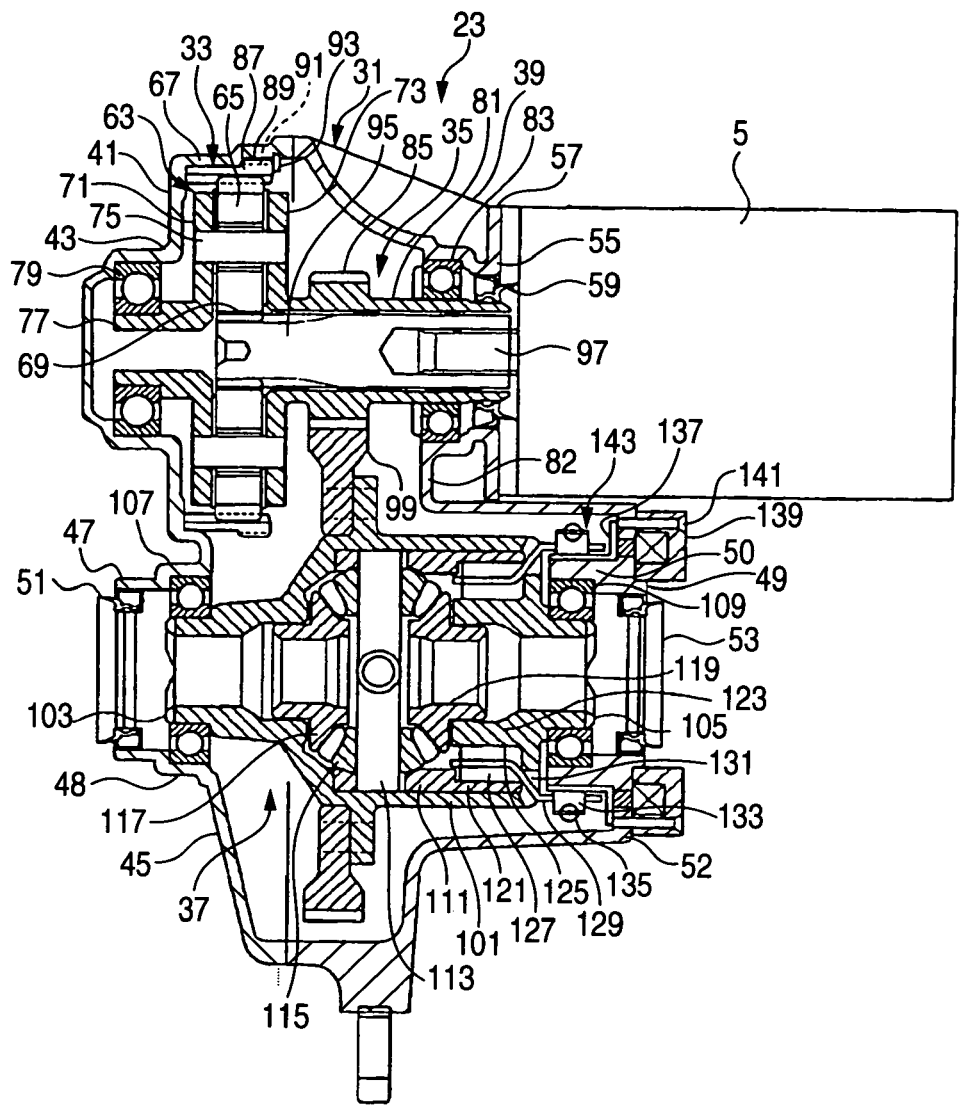
FIG. 2 is a cross sectional view of the reduction-drive device according to the first embodiment.

The motor reduction-drive device 23 of the hybrid automobile 1 is, for example, as shown in FIG. 2. FIG. 2 is a cross sectional view of the motor reduction-drive device.

The motor reduction-drive device 23 has, as shown in FIG. 2, the first reduction mechanism 33, the second reduction mechanism 35, and the rear differential 37 as the differential device (distribution device) within the housing 31 being the stationary side supported at the side of the car body.

The housing 31 is made of aluminum base alloy. The housing 31 is made a set structure of a main body (first housing) 39 and a cover (second housing) 41 which are tightened by bolts and nuts (not shown). Further, an input side 43 and an output side 45 are integrally formed in the housing 31 with the main body 39 and the cover 41.

At the left and right of the output side 45 of the housing 31, boss parts 47, 49 are furnished with sealing parts 51, 53, and provided with bearing supporters 48, 50 at inner parts thereof. One 50 of the bearing supporters is formed to be cylindrical in an inner circumference of an end wall 52, and projects toward an inside of the housing 31.

At the input side 43 of the housing 31, a through portion 55 is formed in the main body 39, and an attaching flange 57 is furnished around the outer circumference of the through portion 55, and is attached with the electric motor 5 and tightened by bolts and nuts (not shown). The through portion 55 is provided with a seal member 59.

The first reduction mechanism 33 is placed at the side of the cover 41, holding the main body 39 of the housing 31 in relation with the electric motor 5. The first reduction mechanism 33 is structured with the planet gear mechanism, and comprises the planetary carrier 63, the planetary gear 65, the internal gear 67, and the sun gear 69.

The planetary carrier 63 couples left and right carrier plates 71, 73 in the circumferential direction of the carrier pin 75 and the planetary gear 65 by means of bridge parts (not shown) extending to connect the carrier plates 71, 73. One 71 of the carrier plates is provided integrally with a hollow axis part 77 turnably supported in the cover 41 (a first side wall) via a ball bearing 79. The other 73 of the carrier plates is provided integrally with a hollow axis 81 turnably supported in a side wall 82 (a second side wall) of the main body 39 of the housing 31 via a ball bearing 83. Accordingly, the planetary carrier 63 is turnably supported by the housing 31. Between the end of the axis 81 and the through part 55 of the main part 39, the seal member 59 is interposed. At the intermediate part of the axis 81, the reduction gear 85 is integrally furnished. By the way, it is sufficient that the reduction gear is formed as a separate simplex member from the planetary carrier 63 and is secured to the carrier 63 rotating integrally.

A plurality of planetary gears 65 are furnished in the rotating circumferential direction of the planetary carrier 63, and are rotatably held by the carrier pin 75.

The internal gear 67 made of steel is secured to the side of the cover 41 of the housing 31, so that the internal gear 67 is unrotatable with respect to the housing 31. The internal gear 67 is formed in the inner circumference of the ring member 87. The ring member 87 is fitted in the side of the cover 41 of the housing 31, and gearing teeth 89 of the outer circumference are in mesh with teeth 91 at the side of the cover 41 to stop rotation and position in the radius direction.

At the end of the ring member 87, a stopper 93 is provided for positioning the ring member 87 in the axial direction with respect to the cover 41.

The sun gear 69 is provided integrally at the end of the transmission shaft 95. The planetary gear 65 is in mesh with the sun gear 69 and the internal gear 67.

The transmission shaft 95 is placed within the hollow axis 81 under relatively rotating freedom, thus the hollow axis 81 (as an output shaft of the first reduction mechanism) is coaxially disposed with the transmission shaft 95 and outer side of the transmission shaft 95. The transmission shaft 95 is connected by a spline with the output part 97 of the electric motor 5. Accordingly, the present device has such a structure where the transmission shaft 95 is connected to the sun gear 69, the transmission shaft 95 extending to the center of the rotating shaft of the planetary carrier 63 for transmitting the output of the electricmotor 5. In the relation between the transmission shaft 95 and the planetary carrier 63, other than that the hollow axis 81 is caused to directly indicate the transmission shaft 95, the bearing or a bush are interposed between the transmission shaft 95 and the planetary carrier 63 to have a relation supporting in an axial direction and/or a diameter direction.

Further, the transmission shaft 95 may integrally formed with the output shaft 97 of the electric motor 5. Furthermore, the sun gear 69 may integrally formed with the transmission shaft 95.

The second reduction mechanism 35 which is placed in the axial direction between the electric motor 5 and the first reduction mechanism 33 comprises the reduction gear 85 and the ring gear 99 of the rear differential 37 in mesh with the reduction gear 85. The portion where the reduction gear 85 and the ring gear 37 are brought in mesh is positioned at an inner side with respect to an outermost portion of the first reduction mechanism in a radial direction. The reduction gear 85 is formed with a helical pinion gear. The ring gear 99 is formed with a helical gear similarly to the reduction gear 85. The second reduction mechanism 35 is desirable in gearing rigidity and can suppress occurrence of abnormal noises, since the reduction gear 85 and the ring gear 99 are formed with the helical gear. An outer diametrical side of the internal gear 67 composed in the first reduction mechanism 33 places in a space facing to a side of the boss 103 of a later mentioned differential case 101, and therefore, the first reduction mechanism 33 itself can take large rotating reduction ratio, and contributes to accomplishing of a compact device of two-axle structure by combining with the second reduction mechanism 35.

The rear differential 37 is provided with a differential case 101 having the ring gear 99. The differential case 101 has the left and right boss parts 103, 105. In the differential 101, the boss parts 103, 105 are turnably supported by the ball bearings 107, 109 in the bearing supporters 48, 50 of the housing 31.

In the differential case 101, an inner case 111 is received and is relatively rotatable with respect to the differential case 101. The inner case 111 has the center of a rotating shaft coaxially with the center of a rotating shaft of the differential case 101, and is almost cylindrical.

To the inner case 111, a pinion gear 115 is supported via a pinion shaft 113. The left and right side gears 117, 119 are in mesh with and connected to the pinion gear 115. The side gears 117, 119 are interlocked with the axle shafts 25, 26 at the side of the rear wheels 11, 13.

At the end of the inner case 111, a connecting part 121 is provided which is thinner in diameter than other parts. To the boss part 105, a gear part 123 is provided which places at the inner circumferential side of the connecting part 121. An outer circumferential side of the gear part 123 is as viewed in FIGS. 3A and 3B.

Figure 3A:
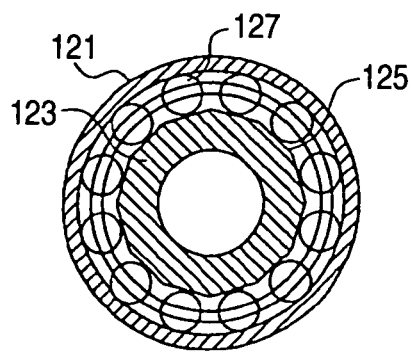
FIG. 3A is a cross sectional view showing the relation between the connecting part and the engaging part.
Figure 3B:
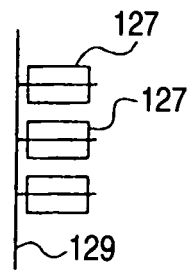
FIG. 3B is the simple developing view showing the arrangement of the rollers (first embodiment).

FIG. 3A is a cross sectional view showing the relation between the connecting part 121 and the gearing part 123, and FIG. 3B is a simple developing view showing an arrangement of rollers.

As seen in FIG. 3A, the outer circumference of the gearing part 123 is formed to be polygonal and furnished with a plurality of plane gearing faces 125. Between the connecting part 121 and the gearing face 125, rollers 127 are interposed respectively. The rollers 127 arranged as seen in FIGS. 3A and 3B are rotatably supported by a supporting member 129. The supporting member 129 extends outside of the differential case 101 from a through-hole 131 of the differential case 131, and engages a brake shoe 133.

The brake shoe 133 is wound on an outer circumference thereof with a ring shaped spring 135. By the spring 135, the brake shoe 133 is forced to the inner circumferential side. The brake shoe 133 is furnished at an inner circumference thereof with a slide plate 137 to which the brake shoe 133 is pressed. The slide plate 137 is rotatably supported to the outer circumference of the bearing supporter 50 of the housing 31. With respect to the slide plate 137, an electromagnet 139 is arranged at the outside of an end wall 52 of the housing 31. The electromagnet 139 is fixedly secured to the outside of the housing 31 by means of screws 141, so that providing of the electromagnet 139 or winding of a lead wire are easy, at the same time excellent in radiation, and stable in the braking performance. Incidentally, division structures are made by the housing 31 and a part including the end wall 52 (an inner face in a radius direction) and the bearing supporter 50 of the bearing 109, and the divisional structures are made one body by means of a steel member and bolts, whereby an aluminum alloy member is possible to use to make the housing 31, and the weight reduction can be accomplished.

An intermittent structure 143 (as a clutch mechanism) is composed of the connecting part 121, the gearing part 123, the rollers 127, the supporting member 129, the brake shoe 133, the spring 135, the slide plate 137, and the electromagnet 139. The intermittent structure 143 is included in the differential 37 and positioned between the second reduction mechanism 217 and the axle shafts 11, 13.

Especially, an actuator constituted of the brake shoe 133, the spring 135, the slide plate 137 and the electromagnet 139 can be applied not only for a clutch mechanism constituted of the connecting part 121, the gearing part 123, rollers 127 and supporting member 129, but also for the other clutch mechanisms such as a dog clutch and a friction clutch, even if the other clutch mechanisms may be applied to this reduction-drive device. This actuator can perform a good responsiveness and a stable clutch function for various types of clutch mechanism.

Accordingly, by rotation of the electric motor 5, the driving force is transmitted from the output part of the electric motor 5 to the transmission shaft 95. The sun gear 69 rotates thereby integrally and the planetary gear 65 rotates. While the planetary gear 65 is rotating, it revolves by engaging the internal gear 67, and the carrier plates 71, 73 reduce rotation with respect to the transmission shaft 95 through the carrier pin 75.

By the reduced rotation of the carrier plate 73, the reduction gear 85 rotates together, and the torque is transmitted to the ring gear 95. The rotation is also reduced by gearing between the reduction gear 85 and the ring gear 99, so that the torque is transmitted to the differential case 101 at the reduced rotation.

When the intermittent mechanism is connected, the torque is transmitted from the differential case 101 to the inner case 111, and transmitted to the side of the axle shafts 25, 27 via the pinion shaft 113, the pinion gear 115, and the side gears 117, 119 so as to drive the rear wheels 11, 13.

At differential rotation of the rear wheels 11, 13, the side gears 117, 119 play the differential rotation through the rotation of the pinion gear 115, and the differential rotation between the rear wheels 11, 13 is allowed.

When the intermittent mechanism 143 is cut off, even if the inner case 111 rotates, the torque is not transmitted to the differential case 101, and the inner case 111 rotates relatively with respect to the differential case 101.

Intermittence of the intermittent mechanism 143 is performed by controlling conduction to the electromagnet 139. When the electromagnet 139 is conducted, the slide plate 137 is attracted to the side of the electromagnet 139, and closely contacted to the inside of the housing 131. By this close contact, the brake shoe 133 displays frictional resistance to the slide plate 137 and exerts the frictional resistance over the support member 129.

Each of the rollers 127 supported by the support member 129 is effected with rotational control in the rotating direction of the differential case 101 by the support member 129. At this time, if the differential case 101 further rotates, the rotation of the differential case 101 goes ahead of the inner case 111, and the roller engages an engaging face 125.

When the roller 127 engages the engaging face 125, reaction force to the engaging face 123 acts on the connecting part 121 via the roller 127. By this reaction, the engaging part 121 deforms to expand the diameter within a range of elastic deformation, and imparts pressure to the inside of the differential case 101 outside in a direction along the rotating radius.

Owing to this pressure, the frictional engagement is provided between the outside of the engaging face 121 and the inside of the differential case 101.

Accordingly, the frictional engagement between the outside of the engaging face 121 and the inside of the differential case 101 is added to the engagement between the engaging face 123 and the connecting part 121 provided by engaging the roller 127 with the engaging face 125, so that the differential case 101 and the inner case 111 rotate together, and the torque can be transmitted to the side of the rear wheels 11, 13 as mentioned above.

When the conduction to the electromagnet 139 is cut off, the slide plate 137 may rotate relatively to the bearing support 50 of the housing 31.

Since the slide plate 137, the brake shoe 133, and the support member 129 rotate as one body, each of the rollers 127 is not effected with the rotational control, so that it does not engage the engaging face 125. The connecting part 121 is not forced to the inside of the differential case 101, and the inner case 111 does not provide the frictional engagement to the differential case 101, either. Therefore, the inner case 111 is free in relative rotation to the differential case 101.

Under the condition of this relative rotational freedom, when the electric motor 5 is at rest, even if the torque is transmitted from the side of the rear wheels 11, 13 and the axle shafts 25, 27 to the side gears 117, 119, the inner case 111 only rotates via the pinion gear 115 and the pinion shaft 113 from the side gears 117, 119, and the rotation is not transmitted to the differential case 101.

Therefore, the second reduction mechanism 35 may be kept stopped, and the second reduction mechanism 35, the first reduction mechanism 33 and the electric motor 5 never rotate. It is accordingly possible to certainly check large energy loss caused by driving the reduction mechanisms 35, 33 from the reverse direction as well as energy loss by driving the stopped electric motor 5 at the rear wheels 25, 27, and possible to attempt an improvement of a fuel consumption, and heighten the durability of the electric motor 5.

Thus, since such a structure is realized that the second reduction mechanism 35 is arranged between the electric motor 5 and the first reduction mechanism 33 so as to distribute the output of the second reduction mechanism 35 to the rear wheels 25, 27 by means of the rear differential 37, so that one piece of transmission shaft 95 exists at the side of the first reduction mechanism 33 other than the rear differential 37, and it is possible to reduce in size as a whole, and lighten the weight.

Since the second reduction mechanism 35 is disposed between the electric motor 5 and the first reduction mechanism 33 so as to separate the first reduction mechanism 33 from the electricmotor 5, taking the distance, an error in setting-up of the electric motor 5 may be restrained from effecting to a positioning precision of the sun gear 69 of the first reduction mechanism 33, and it is possible to suppress occurrences of vibrations or abnormal sounds in the first reduction mechanism 33, and to improve performance of acoustic vibration or durability.

That is, in the hybrid automobile 1, the motor reduction-drive device 23 for transmitting the motive power to the rear wheels 11, 13 may be reduced in size and lightened in weight. Further, it is possible to improve performance of acoustic vibration or durability.

Beside, since there is the margin of space in the rear differential 37 at the side of the electric motor 5, it is very easy to provide the intermittent mechanism 143 of adding a free differential function to the rear differential 37.

The planetary carrier 63 is rotatably supported to the walls of the housing 31, excellent in supporting rigidity, simple in the mechanism, and less to cause sounds. Reliability may be heightened.

The motor 5 and clutch mechanism 173 are adjacently positioned, interposing the main body 39, so that their axes are disposed in parallel. Further, the first reduction mechanism 33 is positioned on an opposite side of the motor 5 with respect to the axial direction, interposing the second reduction mechanism 35. Thereby, the clutch mechanism 143 and the motor 5 are disposed in an overlap position in which they are partially overlapped in the axial direction. Furthermore, the actuator (constituted of the brake shoe 133, the spring 135, the slide plate 137 and the electromagnet 139) and the motor 5 also are disposed in an overlap position in which they are partially overlapped in the axial direction. Therefore, the reduction-driving device becomes compact in its axial direction.

Second Embodiment

Figure 4:
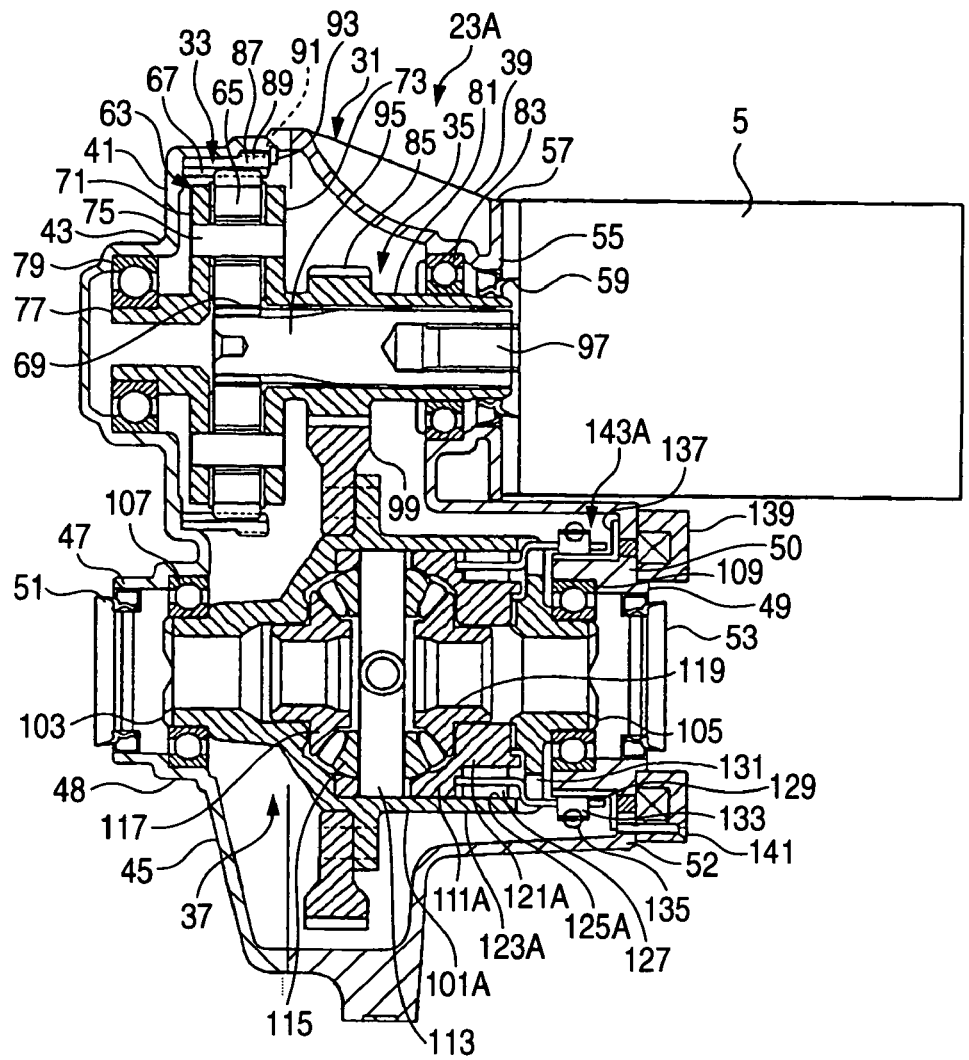
FIG. 4 is a cross sectional view of the motor reduction-drive device according to a second embodiment of the invention.
Figure 5A:
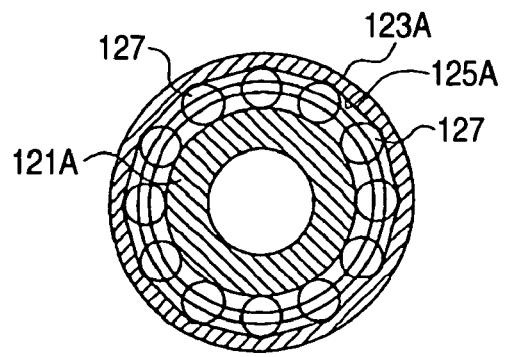
FIG. 5A is a cross sectional view showing the relation between the connecting part and the engaging part.
Figure 5B:
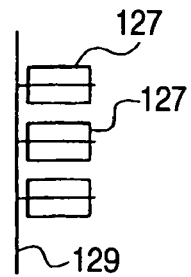
FIG. 5B is the simple developing view showing the arrangement of the rollers (second embodiment).

FIGS. 4, 5A and 5B are concerned with a second embodiment of the invention, and FIG. 4 is a cross sectional view of the motor reduction-drive device, and FIG. 5A is a cross sectional view showing the relation between the connecting part and the engaging part, while FIG. 5B is a simple developing view showing the arrangement of the rollers. By the way, the basic structure is the same as that of the first embodiment, and the corresponding parts are given the same reference numerals for explanation.

The motor reduction-drive device 23A of the present embodiment modifies the connecting part 121A of the intermittent mechanism 143A and the engaging part 123A. The connecting part 121A of this embodiment is provided integrally with the inner case 111A. The engaging part 123A is provided to the differential case 101A. A polygonal engaging face 125A is formed in the inside of the differential case 101A. The rollers 127 are interposed between the connecting part 121A and the engaging part 123A.

Therefore, in this embodiment, if the rollers 127 are effected with rotational control via the supporting member 129, each of the rollers 127 engages the engaging face 125A with respect to rotation of the differential case 101A, so that the differential case 101A and the inner case 111A rotate together.

Releasing the rotational control by the supporting member 129, the engagement of the roller 127 with the gearing face 125A is released, and the side of the inner case 111A may rotate relatively to the differential case 101A.

Thus, also in this embodiment, similarly to the first embodiment, the first and second reduction mechanisms 33, 35 are not forcibly rotated by the rear wheels 11, 13, and the fuel consumption may be increased.

Third Embodiment

Figure 6:
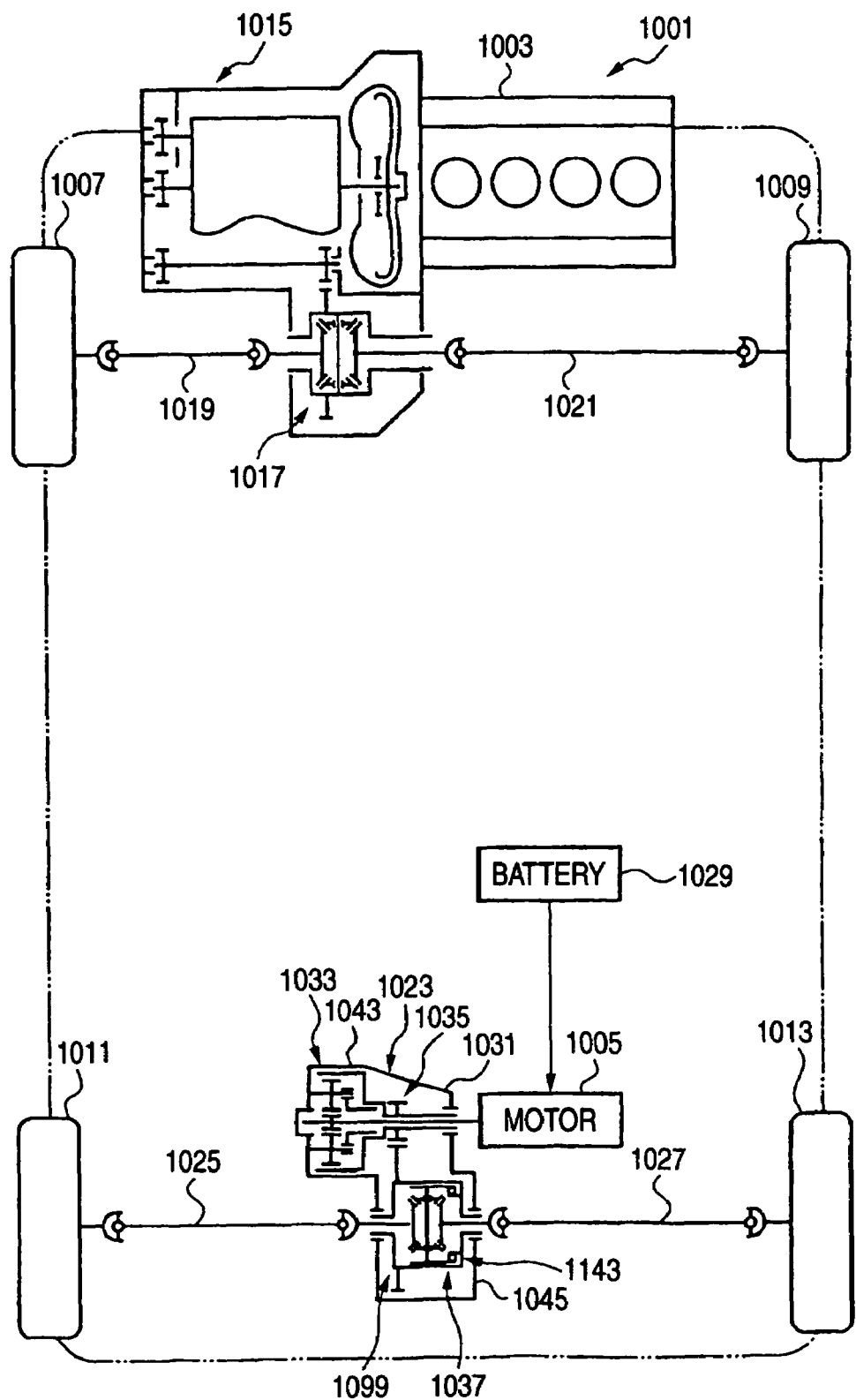
FIG. 6 is a skeleton plan view of the hybrid automobile in which a reduction-drive device according to a third embodiment of the invention is applied.

FIG. 6 is a skeleton plan view of the four wheel drive automobile applied with the reduction-drive device according to the third embodiment of the invention. As seeing FIG. 6, the four wheel drive automobile 1001 has the engine 1003 being the internal combustion engine as the main drive source and the electric motor 1005 as the sub-drive source being the drive source. In this embodiment, the engine 1003 is the drive source for driving the left and right front wheels 1007, 1009, while the electric motor 1005 is the drive source for driving the left and right rear wheels 1011, 1013. It is also possible to drive the front wheels by the electric motor 1005 of the sub-drive source, and drive the rear wheels 1011, 1013 by the engine 1003 of the main drive source.

The output of the engine 1003 is issued into a front differential device 1017 as the differential device via a transmission 1015. To the front differential 1017, via left and right axle shafts 1019, 1021, the front wheels 1007, 1009 are connected in interlocking.

The output of the electric motor 1005 is issued into the reduction-drive device 1023. To the outputting side of the reduction-drive device 1023, via the left and right axle shafts 1025, 1027, the left and right rear wheels 1011, 1013 are connected in interlocking.

To the output side of the reduction-drive device 1023, via the left and right axle shafts 1025, 1027, the left and right rear wheels 1011, 1013 are connected in interlocking.

The electric motor 1005 is supplied with current from a battery 1029, or is directly supplied with current from a generator generated when the engine 1003 rotates to output. At speed reduction of the automobile, the electric generation of the generator is charged in the battery 1029.

While traveling, ordinarily, torque is transmitted to the front differential device 1017 via the transmission 1015 by driving of the engine 1003. From the front differential device 1017, via the left and right axle shafts 1019, 1021, the torque is transmitted to the left and right front wheels 1007, 1009.

Further, the electric motor 1005 is supplied with current, and the output of the electric motor 1005 is transmitted to the reduction-drive device from which, via the left and right axle shafts 1025, 1027, the torque is transmitted to the left and right rear wheels 1011, 1013.

Therefore, the four wheel drive automobile 1001 can travel under the four-wheel driving condition, by driving of the front wheels 1007, 1009 by the engine 1003 and by auxiliary driving of the rear wheels 1011, 1013 by the electric motor 1005.

When starting and accelerating to travel, the electric power supply is added to the electric motor 1005 from the battery 1029, and smooth starting and accelerating are possible. When reducing the speed of the automobile, the battery 1029 is charged with electric power by the generator to make preparation for subsequent starting and accelerating.

Figure 7:
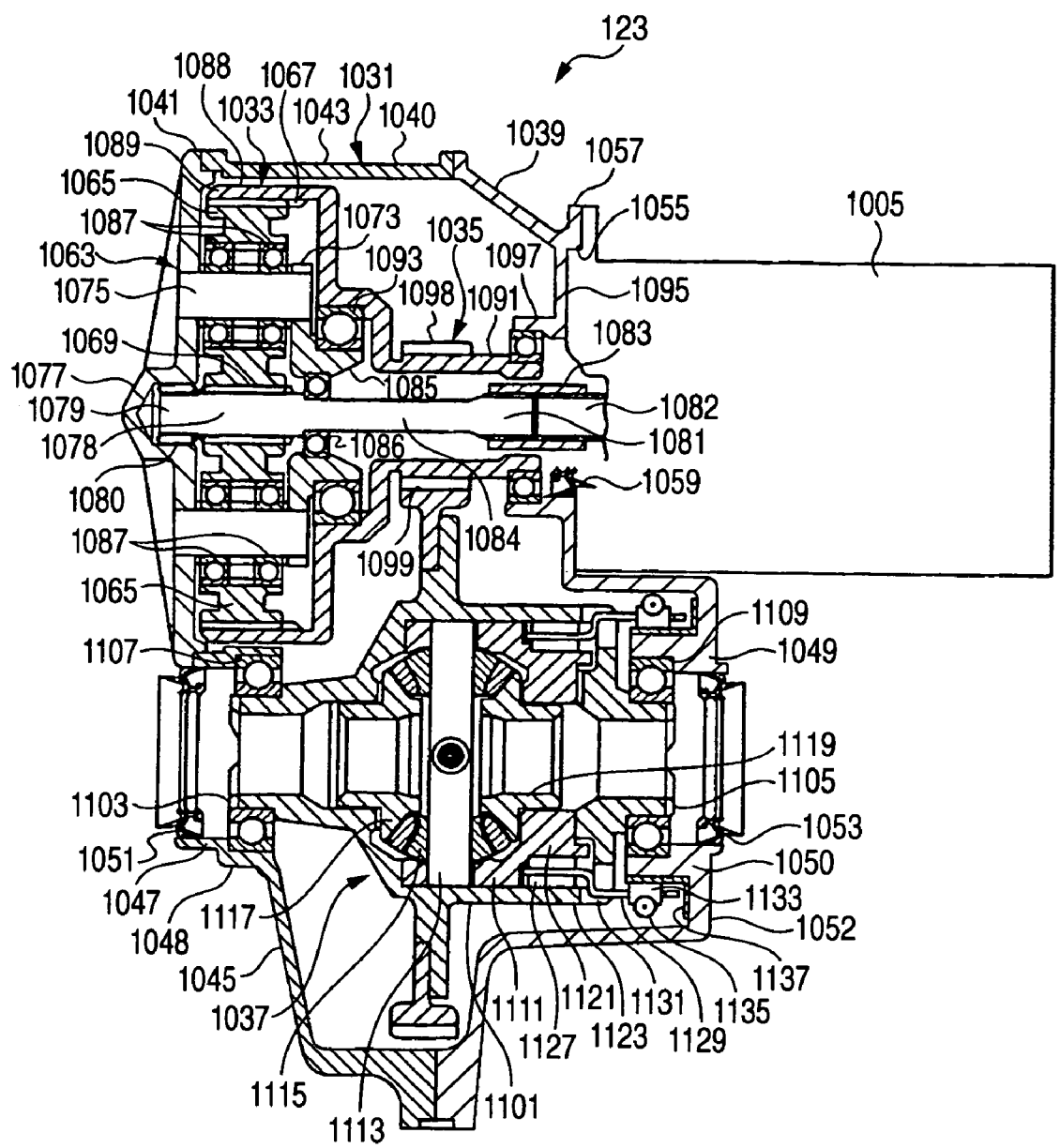
FIG. 7 is a cross sectional view of the reduction-drive device (third embodiment).
Figure 8:
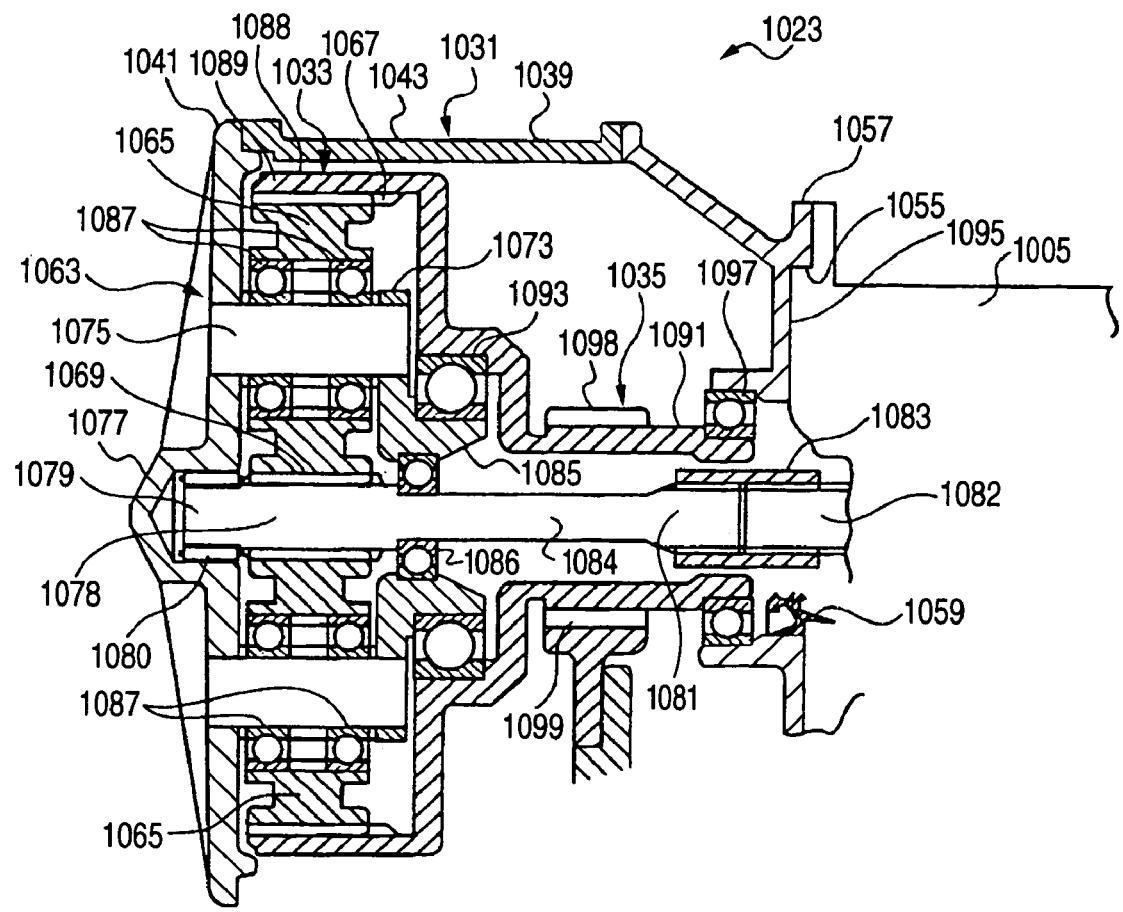
FIG. 8 is a cross sectional view showing the relation between the connecting part and the engaging part (third embodiment).

The reduction-drive device 1023 of the four wheel drive automobile 1001 is, for example, as shown in FIGS. 7 and 8. FIG. 7 is a cross sectional view of the reduction-drive device, while FIG. 8 is a cross sectional view of the enlarged elementary parts.

The reduction-drive device 1023 has, as shown in FIGS. 7 and 8, the first reduction mechanism 1033 as the reduction mechanism, the second reduction mechanism 1035, and the rear differential device 1037 as the differential device (distribution device) within the housing 1031 being the stationary side supported at the side of the car body.

The housing 1031 is constituted of a cover 1041 (a first housing), intermediate portion 1040 (a third housing) and a main body 1039 (a second housing), and they are tightened by bolts and nuts (not shown). The housing 1031 is structured of an input side 1043 and an output side 1045.

At the left of the output side 1045 of the housing 1031 provided on the intermediate portion 1040 and the right of the output side 1045 of the housing 1031 provided on the main body 1039, boss parts 1047, 1049 are furnished with sealing parts 1051, 1053, and provided with bearing supporters 1048, 1050 at inner parts thereof. One 1050 of the bearing supporters is formed to be cylindrical in an inner circumference of an end wall 1052, and projects toward an inside of the housing 1031.

At the input side 1043 of the housing 1031, a through portion 1055 is formed in the main body 1039, and an attaching flange 1057 is furnished around the outer circumference of the through portion 1055, and is attached with the electric motor 1005 and tightened by bolts and nuts (not shown). The through portion 1055 is provided with a seal member 1059.

The first reduction mechanism 1033 is placed at the side of the cover 1041 of the housing 1031 in relation with the electric motor 1005. The first reduction mechanism 1033 comprises the carrier 1063, the planetary gear 1065, the internal gear 1067, and the sun gear 1069.

The carrier 1063 is integrally provided to a side wall (a first side wall) of the cover 1041 of the housing 1031, so that the carrier is unrotatable with respect to the housing 1031. Specifically, one of the left and right carrier plates of the carrier 1063 is composed of the cover 1041. To the cover 1041, the other carrier plate 1073 is disposed in opposition. The cover 1041 and the carrier plate 1073 as the left and right carrier plates are connected by bridge portions (not shown) provided equidistantly in the circumferential direction. The carrier pin 1075 is supported by the cover 1041 and the carrier plate 1073. The plural carrier pins 1075 are provided in the plural steps for rotation of the carrier 1063.

The cover 1041 is furnished integrally with a hollow axis supporter 1077 which is rotatably supported with one end 1079 of the transmission shaft 1078 via a needle bearing 1080. The other end 1081 of the transmission shaft 1079 extends to the side of the electric motor 1005. The other end 1081 is connected to the output shaft 1082 of the electric motor 1005 by a sleeve 1083. The transmission shaft 1078 is narrower in diameter at an intermediate part than both ends.

The carrier plate 1073 is provided integrally with the boss part 1085 which is supported at the intermediate part of the transmission shaft 1078 by the ball bearing 1086.

The plural planetary gears 1065 are furnished in the rotating circumferential direction of the carrier 1063, and each of them is rotatably supported on the carrier pin 1075 via the ball bearing 1087.

The internal gear 1067 is provided on a stepped cylindrical rotating member 1088 comprising the ring part 1089 and the boss part 1091. The internal gear 1067 is formed in the inner circumference of the ring part 1089. The boss part 1091 is formed to be stepped and is idle on the outer circumference of the transmission shaft 1078, and extends to the electric motor 1005. The boss part 1091 is rotatably supported at its one end on a boss 1085 of the carrier plate 1073 via the ball bearing 1093, and is rotatably supported at the other end to a wall 1095 (a second wall) of the main body 1039 via the ball bearing 1097. By this supporting, the internal gear 1067 is rotatably supported by the carrier 1063 and the housing 1031.

The sun gear 109 is provided integrally at the end of the transmission shaft 1078, and is connected by interlocking the electric motor 1005. The planetary gear 1065 is in mesh with the sun gear 1069 and the internal gear 1067.

The second reduction mechanism 1035 comprises the reduction gear 1098 and the ring gear 1099 in mesh with the reduction gear 1098. The portion where the reduction gear 1035 and the ring gear 1099 are brought in mesh is positioned at an inner side with respect to an outermost portion of the first reduction mechanism in a radial direction. The reduction gear 1098 is structured with an output part of issuing rotation to the rear differential device 1037 at the internal gear 1067 supported between the carrier 1063 and the housing 1031. Specifically, the reduction gear 1098 is provided at the boss part 1091 of the rotating member 1088 between the ball bearings 1093, 1097. The reduction gear 1098 is formed with a helical pinion gear. The ring gear 1099 is formed with a helical gear similarly to the reduction gear 1098. The second reduction mechanism 1035 is desirable in gearing rigidity and can suppress occurrence of abnormal noises, since the reduction gear 1098 and the ring gear 1099 are formed with the helical gear.

The rear differential 1037 is provided with the differential case 1101 having the ring gear 1099. The differential case 1101 has the left and right boss parts 1103, 1105. In the differential 1101, the boss parts 1103, 1105 are turnably supported by the ball bearings 1107, 1109 in the bearing supporters 1048, 1050 of the housing 1031.

In the differential case 1101, an inner case 1111 is received and is relatively rotatable with respect to the differential case 1101. The inner case 1111 has a center of a rotating shaft coaxially with a center of a rotating shaft of the differential case 1101, and is almost cylindrical.

To the inner case 1111, a pinion gear 1115 is supported via a pinion shaft 1113. The left and right side gears 1117, 1119 are in mesh with and connected to the pinion gear 1115. The side gears 1117, 1119 are interlocked with the axle shafts 1025, 26 at the side of the rear wheels 1011, 1013.

At the end of the inner case 1111, a connecting part 1121 is provided which is smaller in diameter than other parts. To the differential case 1101, a gear 1123 is provided which places at the outer circumferential side of the connecting part 1121. An inner circumferential side of the gear 1123 is as viewed in FIG. 9.

Figure 9:
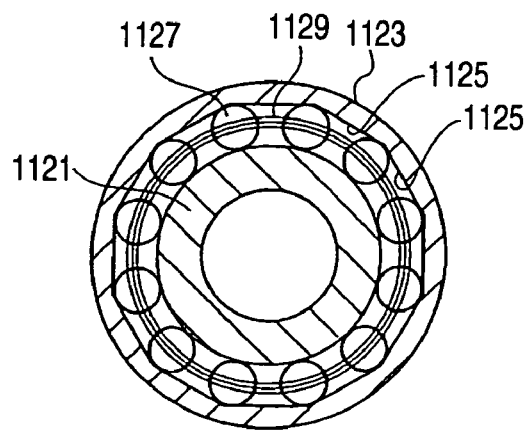
FIG. 9 is a cross sectional view of the enlarged element parts of the reduction-drive device (third embodiment).

FIG. 9 is a cross sectional view showing the relation between the connecting part 1121 and the gear 1123.

As seen in FIG. 9, the inner circumference of the gearing part 1123 is formed to be polygonal and furnished with a plurality of plane gearing faces 1125. Between the connecting part 1121 and the gearing face 1125, rollers 1127 are interposed respectively. The arranged rollers 1127 are rotatably supported by a supporting member 1129. The supporting member 1129 extends outside of the differential case 1101 from a through-hole 1131 of the differential case 1101, and engages a brake shoe 1133.

The brake shoe 1133 is wound on an outer circumference thereof with a ring shaped spring 1135. By the spring 1135, the brake shoe 1133 is forced to the inner circumferential side. The brake shoe 1133 is furnished at an inner circumference thereof with a steel-made slide plate 1137 to which the brake shoe 1133 is pressed. The slide plate 1137 is rotatably supported to the outer circumference of the bearing supporter 1050 of the housing 1031. The slide plate 1137 functions a lining for the housing 1031 formed with s light metal, for example, aluminum.

Next, workings will be explained.

By rotation of the electric motor 1005, the driving force is transmitted from an output shaft 1082 of the electric motor 1005 to the transmission shaft 1084. The sun gear 1069 rotates integrally by this transmission and the planetary gear 1065 rotates. The planetary gear 1065 rotates around the carrier pin 1075 at the stationary side, but it does not revolve. By the rotation of the planetary gear 1065, the internal gear 1067 reduces rotation, and by this rotation, the rotating member 1088 rotates.

By the rotation of the rotating member 1088, the reduction gear 1098 rotates together, and the torque is transmitted to the ring gear 1099. The rotation is also reduced by gearing between the reduction gear 1098 and the ring gear 1099, so that the torque is transmitted to the differential case 1101 at the reduced rotation.

The supporting member 1129 frictionally engages a slide ring 1137 via the brake shoe 1133. By the frictional engagement, the rotation of the supporting member 1129 is delayed with respect to the differential case 1101. By this delay, the rollers 1127 engages an engaging face 1125, so that the differential case 1101 and the inner case 1111 rotate together, enabling to transmit the torque to the rear wheels 1011, 1013 as mentioned above.

When the rotating output of the electric motor 1005 stops, the rotation of the differential case 1101 also stops. Then, the rotation is input from the left and right rear wheels 1011, 1013, and even if the inner case 1111 rotates via the side gears 1117, 1119, the pinion gear 1115, and the pinion shaft 1113, since the roller 1127 makes an idle running in a valley of the engaging face 1125, the roller 1127 does not engage the engage face 1125. Therefore, the inner case 1111 may rotate relatively under freedom to the differential case 1101.

Under this relative rotational freedom, when the electric motor 1005 is at rest, even if the torque is transmitted from the side of the rear wheels 1011, 1013 to the axle shafts 1025, 1027, the side gears 1117, and 1119, the inner case 1111 only rotates via the pinion gear 1115 and the pinion shaft 1113 from the side gears 1117, 1119, and the rotation is not transmitted to the differential case 1101.

Therefore, the second reduction mechanism 1035 may be kept stopped, and the second reduction mechanism 1035, the first reduction mechanism 1033 and the electric motor 1005 never rotate by the rear wheels 1011, 1013. It is accordingly possible to certainly check large energy loss caused by driving the reduction mechanisms 1035, 1033 in the reverse direction as well as energy loss by driving the stopped electric motor 1005 at the rear wheels 1025, 1027, attempt an improvement of a fuel consumption, and heighten the durability of the electric motor 1005.

In such a manner, it is possible to transmit the rotating output at high speed of the electric motor 1005 to the sun gear 1069, and to transmit at reduction the high speed rotation of the sun gear 1069 via the planetary gear 1065 from the internal gear 1067. Accordingly, while performing the high speed reduction, occurrences of abnormal noises are less to cause. Further, since the high speed rotation of the electric motor 1005 is reduced at high speed, the high output may be obtained, though the electric motor is not made large in size, and weight increase may be restrained.

Beside, the carrier 1063 is supported to the stationary side, and since the internal gear 1067 is supported in the boss part 1085 of the carrier 1063 and the wall 1095 of the housing 1031, the supporting rigidity of the internal gear 1067 is high, and the gearing between the internal gear 1067 and the planetary gear 1065 may be certainly made, causing no or little rattling.

Even if the sun gear 1069 and the output shaft 1082 of the electric motor 1005 more or less deviate from the core owing to such as an attaching error, the core deviation can be absorbed by deflection of the transmission shaft 1078 extending till the electric motor. In this case, the intermediate part 1084 of the transmission shaft 1078 is formed to be narrower in diameter than both ends, and therefore the deflection may be accelerated.

Therefore, the core deviation is difficult to extend to the gearing part between the sun gear 1069 and the planetary gear 1065, and in particular, since both sides of the sun gear 1069 is supported to the stationary side by the needle bearing 1080, the ball bearing 1086, and the carrier 1063, the gearing between the sun gear 1069 and the planetary gear 1065 can be certainly made.

Thereby, since the gearing at the first reduction mechanism 1033 causes no rattling or less rattling, abnormal noises can be certainly suppressed from the low speed rotation to the high speed rotation. Further, being no rattling or less rattling, the durability of the device can be improved.

In the second reduction mechanism 1035, the reduction gear 1098 is supported at one side thereof by the housing 1031 via the ball bearing 1093 and the carrier 1063, and is supported at the other side by the housing 1031 via the ball bearing 1097, and therefore, the supporting rigidity is high, and the gearing between the reduction gear 1098 and the ring gear 1099 can be steadily carried out with no or little rattling.

Accordingly, from the low speed rotation to the high speed rotation, abnormal noises can be certainly suppressed in the second reduction mechanism 1035. Further, being no or less rattling, the durability of the device can be improved.

Since abnormal noises can be suppressed, the electric motor 1005 can be rotated at high speed, and the high output and the high speed rotation are available by the miniaturized electric motor 1005 as the reduction drive device 1023.

The second reduction mechanism 10035 is placed between the electric motor 1005 and the first reduction mechanism 1033, and the output of the second reduction mechanism 1035 is distributed to the rear wheels 1025, 1027 by the rear differential device 1037, so that such a structure is available that one piece of transmission shaft 1078 exists at the side of the first reduction mechanism 1033 other than the rear differential 1037, and it is possible to reduce in size as a whole, and lighten the weight.

That is, in the four wheel drive automobile 1001, the reduction-drive device 1023 for transmitting the motive power to the rear wheels 1011, 1013 maybe reduced in size and lightened in weight. Further, it is possible to improve performance of acoustic vibration or durability.

Beside, since there is a margin of space in the rear differential device 1037 at the side of the electric motor 1005, it is very easy to provide the intermittent mechanism of adding a free differential function to the rear differential device 1037.

The electric motor 1005 is the sub-drive source for the other engine 1003, so that the electric motor 1005 may be miniaturized and lightened in weight.

The first reduction mechanism 1033 can be taken off as one body together with the cover 1041 from the housing 1031. By taking off as one body, it is easy to set up, disassemble and repair the first reduction mechanism 1033.

Fourth Embodiment

Figure 10:
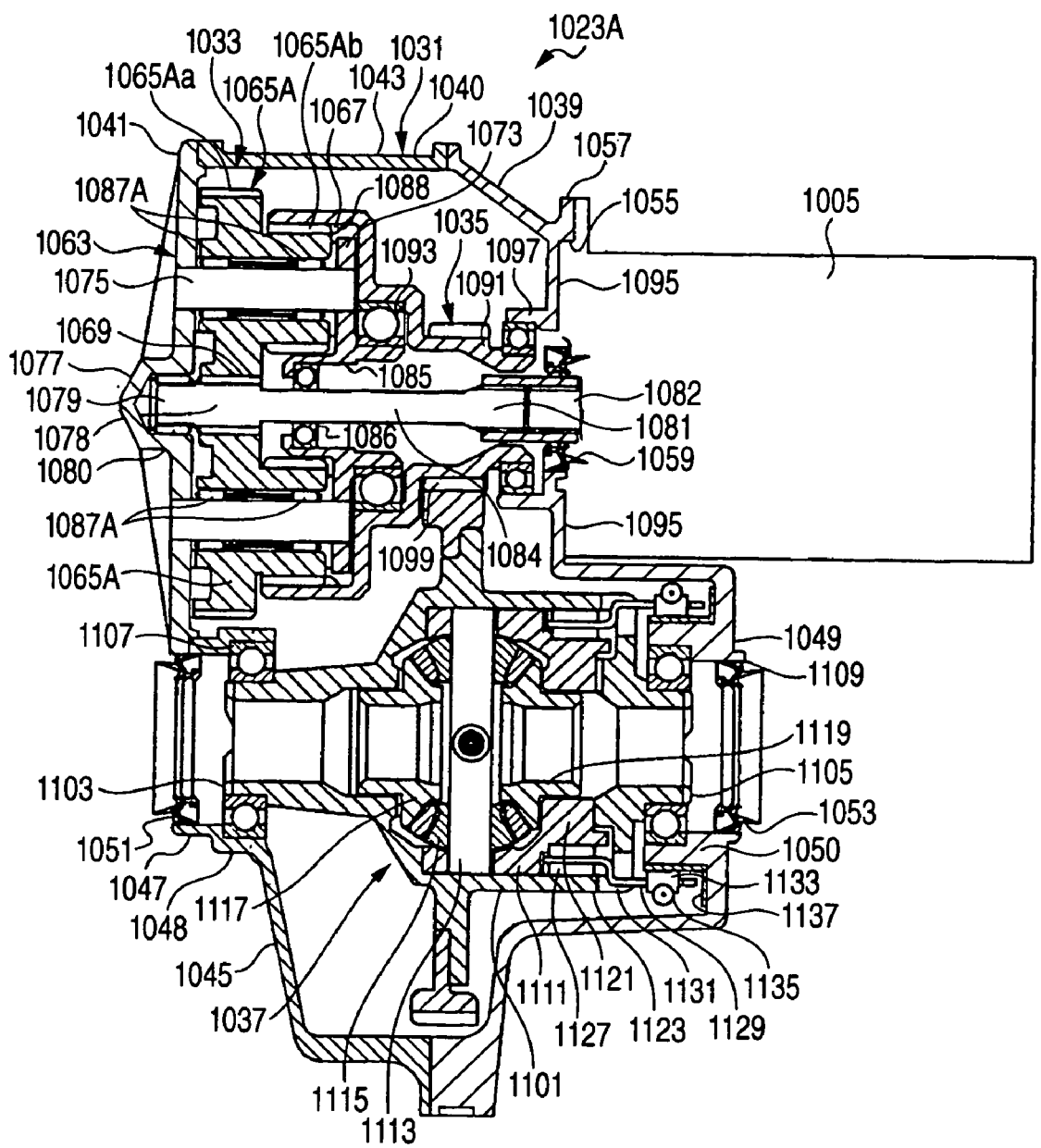
FIG. 10 is a cross sectional view of the reduction-drive device (fourth embodiment).
Figure 11:
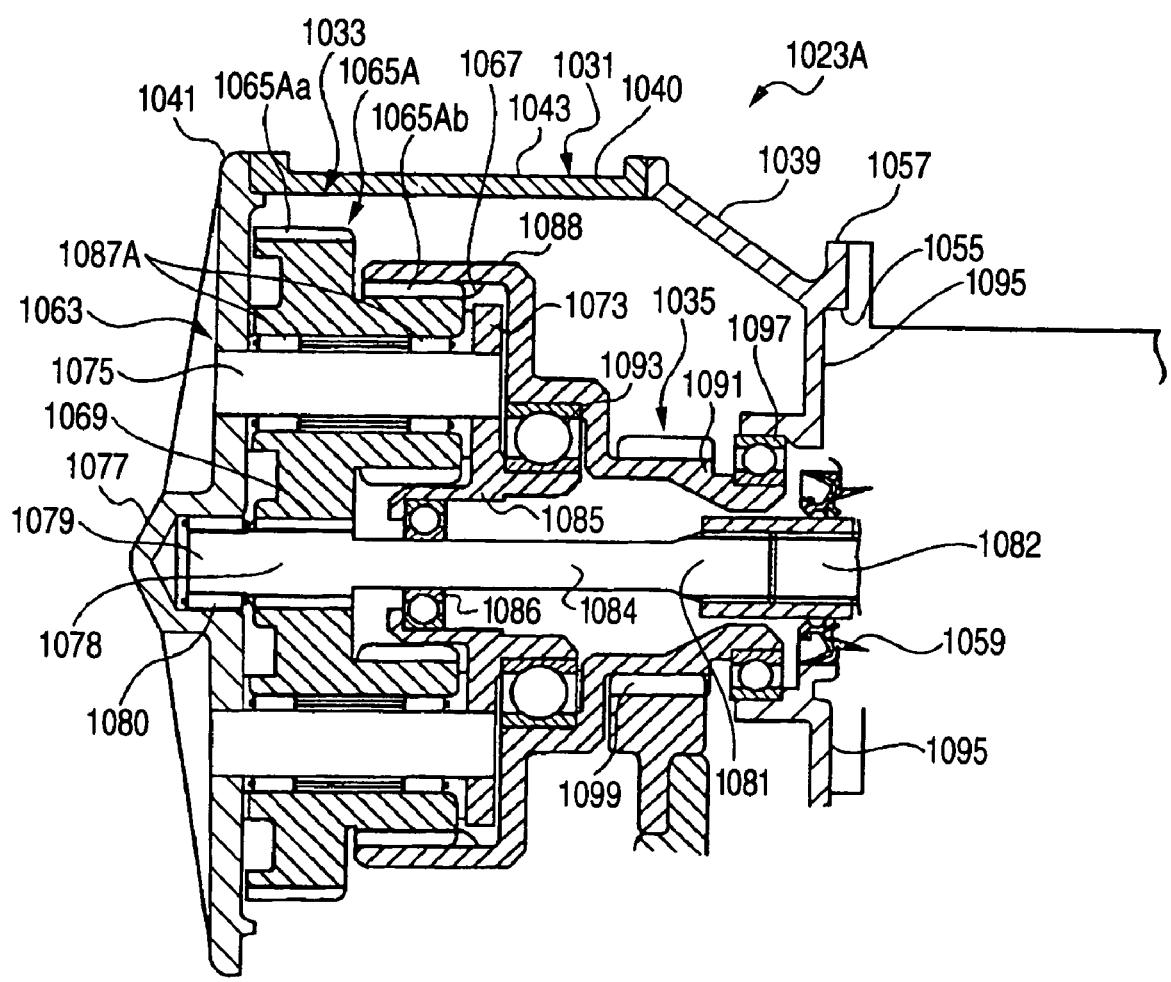
FIG. 11 is a cross sectional view of the enlarged element parts of the reduction-drive device (fourth embodiment).

FIGS. 10 and 11 are concerned with the fourth embodiment of the invention, and FIG. 10 is a cross sectional view of the reduction-drive device, and FIG. 11 is a cross sectional view of enlarged elementary parts. By the way, the basic structure is the same as that of the third embodiment, and the corresponding parts are given the same reference numerals for explanation.

In the reduction mechanism 1023A of this embodiment, the planetary gear 1065A is structured in two steps of a first step gear 1065Aa and a second step gear 1065Ab. The planetary gear 1065A may be formed in plural steps more than the two steps. The planetary gear 1065A is rotatably supported by the carrier pin 1075 via the needle bearing 1087A. The sun gear 1069 is in mesh with the first step gear 1065Aa, while the internal gear 1067 is in mesh with the second step gear 1065Ab.

The rotating input from the electric motor 1005 is reduced in two steps between the sun gear 1069—the first step gear 1065Aa and the internal gear 1067—the second step gear 1065Ab. Thus, the higher reduction can be performed.

Accordingly, in this embodiment, the similar effect to that of the third embodiment is displayed, beside, the high output can be obtained by the more miniaturized electric motor 1005.

It is also possible that the carrier 1063 is formed with the carrier plate of a separate member from the housing 1031, and an outer carrier plate is tightened by such as bolts to the housing.

The reduction-drive device of the invention employs the planetary gear, the internal gear, and the sun gear for transmitting the driving force, and as to others than the structure detailed in the embodiments, such a structure also falls within an equivalent range of the invention that the planetary gear, the internal gear, and the sun gear are made contact type rollers of a frictional drive system, and each of the contact type rollers is joined in a manner of enabling to contact and drive.

The differential device is not limited to the only gear type differential device described in the Embodiments, but may use a coupling such as a viscous fluid type interposed from the case inputted with the driving force to each of the wheels.

The reduction-drive device of the invention can be also disposed at the side of the front wheels, and applied not only to the four wheel drive automobile, but to other devices.

Fifth Embodiment

Figure 12:
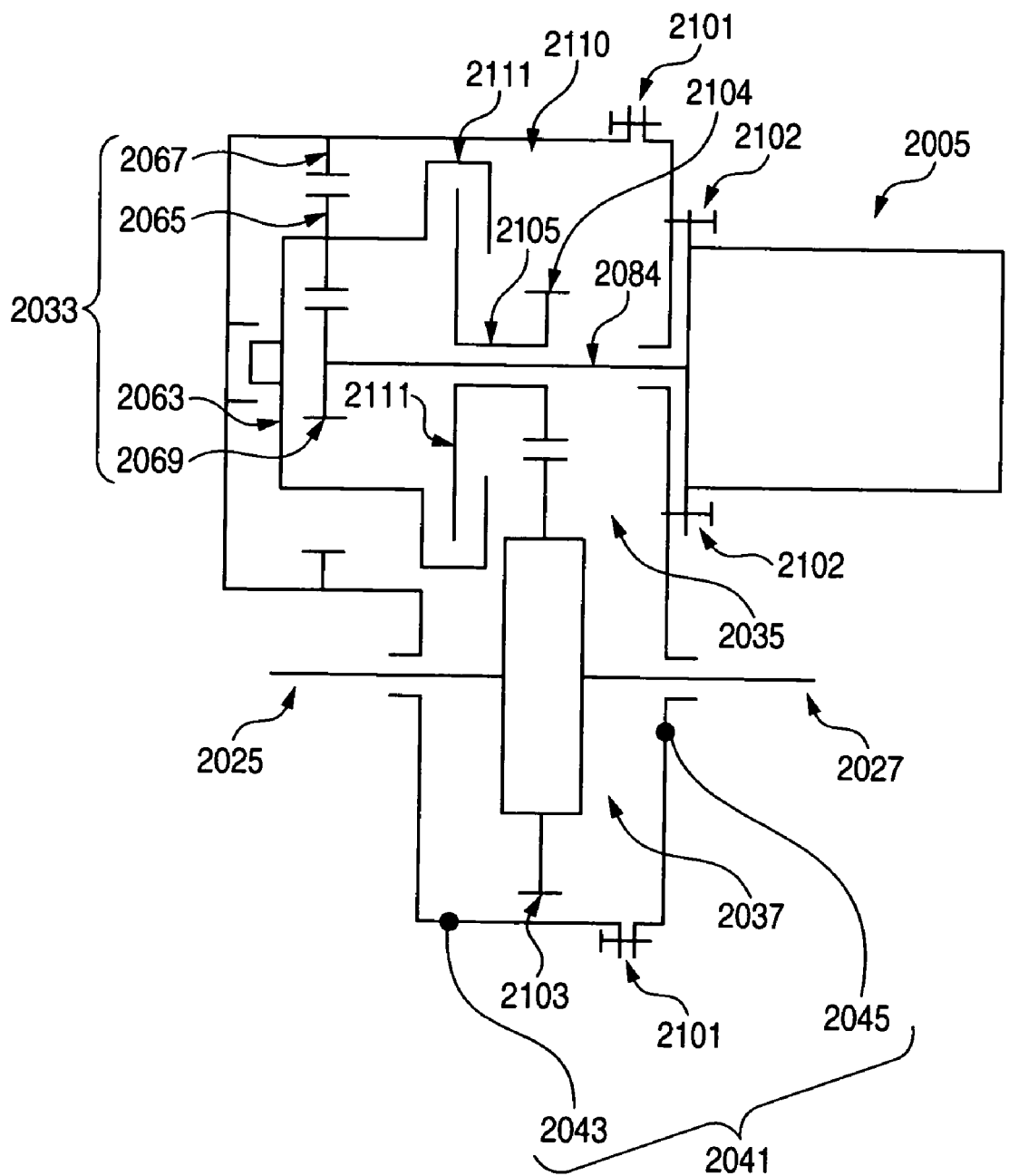
FIG. 12 is a frame diagram of a reduction-drive device of a fifth embodiment.

FIG. 12 is a frame diagram of a reduction-drive device of a fifth embodiment. The reduction-drive device has a electric motor 2005 as a driving source, a housing 2041, a first reduction mechanism 2033, a second reduction mechanism 2035 and a distribution device 2037.

The motor 2005 includes a transmission shaft 2084 as an output shaft thereof, and fixed to the housing 2041 by bolts 2102.

The housing 2041 has a first housing disposed on a side of the first reduction mechanism 2033 and a second housing disposed on a side of the motor 2005. The first and the second housing are fixed by bolts 2101.

The first reduction mechanism 2033 includes a planet gear mechanism constituted of a sun gear 2069, planetary carrier 2063, a planetary gear 2065 and a ring gear 2067. The sun gear 2069 is integrally formed with the transmission shaft 2084, or is formed integrally rotatable with the transmission shaft 2084. The planetary carrier 2063 is rotatably supported on the first housing 2043. The planetary gear 2065 is rotatably supported on the planetary carrier 2063 and is mesh with the sun gear 2069 and ring gear 2067. The ring gear 2067 is unrotatably fixed to the first housing 2043.

A clutch 2110 is provided between the first reduction mechanism 2033 and the second reduction mechanism 2035. The clutch includes an input side 2111 integrally rotatable with the planetary carrier 2063, an output side 2112, and an output shaft 2105 integrally rotatable with the output shaft 2112. The output shaft 2105 is coaxially disposed with the transmission shaft 2084, and disposed outwardly of the transmission shaft 2084. Further, a reduction gear 2104 is integrally formed with the output shaft 2105 or is formed integrally rotatable. The reduction gear 2104 may constituted of a pinion gear, in order to increase a reduction effect.

The distribution device is provided with a ring gear 2103. The second reduction mechanism 2035 is disposed in a position between the motor 2005 and the first reduction mechanism 2033 in a direction of their axes, and is constituted of the reduction gear 2104 and the ring gear 2103.

An output from the motor 2005 is transmitted to the sun gear 2069 via the transmission shaft 2084. By the rotation of the sun gear 2069, the planetary gear 2065 is revolved in orbital motion and rotated on its axis. By this orbital motion, the planetary gear 2069 is rotated. Thus, the output is transmitted to the input side 2111 of the clutch 2110. When the clutch 2110 is engaged, the output is further transmitted to the second reduction mechanism 2035, then distributed to axle shafts 2025, 2027 via the distribution device 2037. A differential mechanism may be built-in the distribution device 2037, and on this case, the output transmitted to the ring gear 2103 is differentially distributed to the both axle shafts 2025, 2027. As a result, the axle shafts 2025, 2027 are differentially driven.

When the clutch 2110 is disengaged, a transmission of torque between the motor 2005 and the axle shafts 2025, 2027 are interrupted.

Sixth Embodiment

Figure 13:
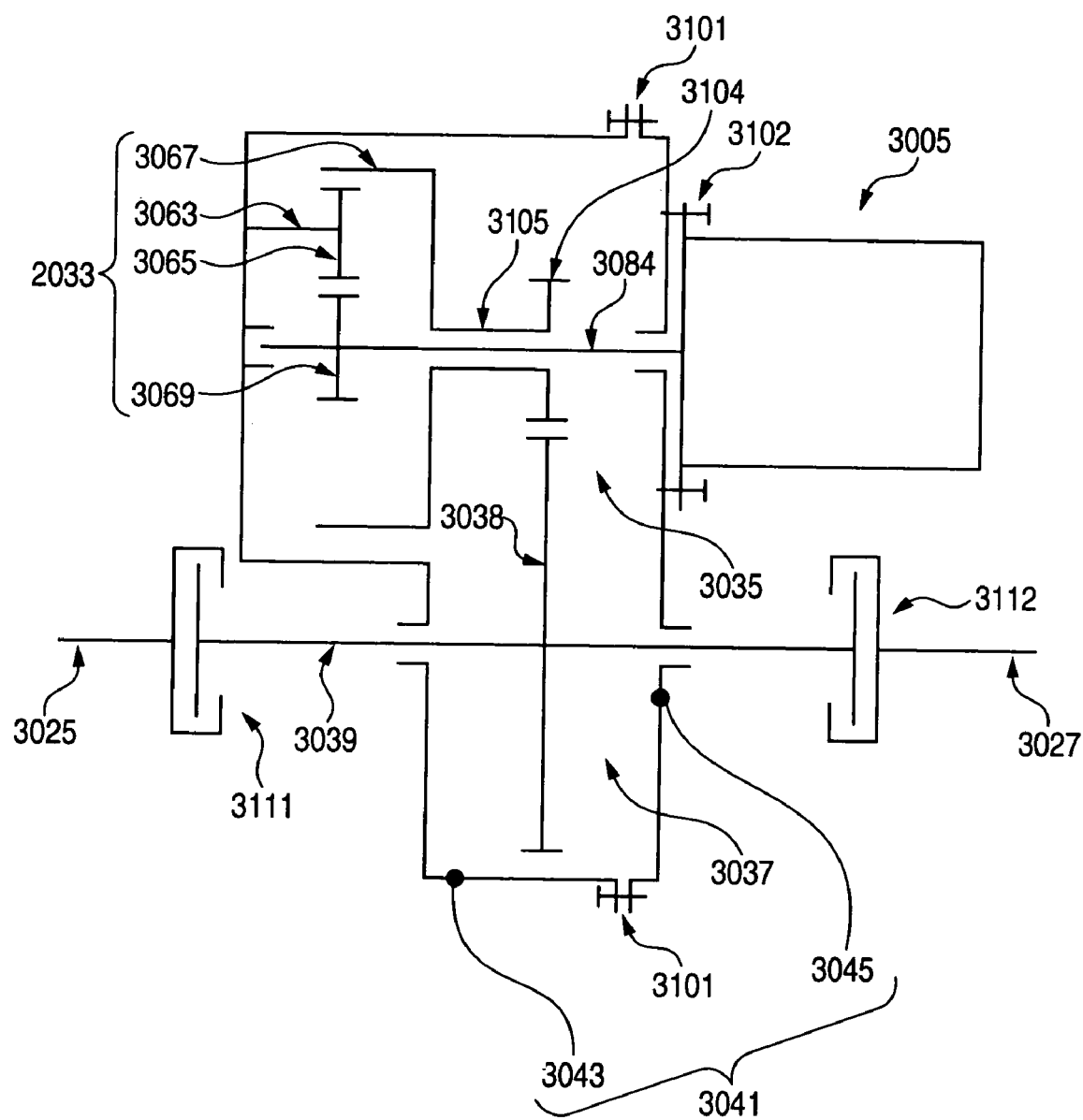
FIG. 13 is a frame diagram of a reduction-drive device of a sixth embodiment.
Figure 14:
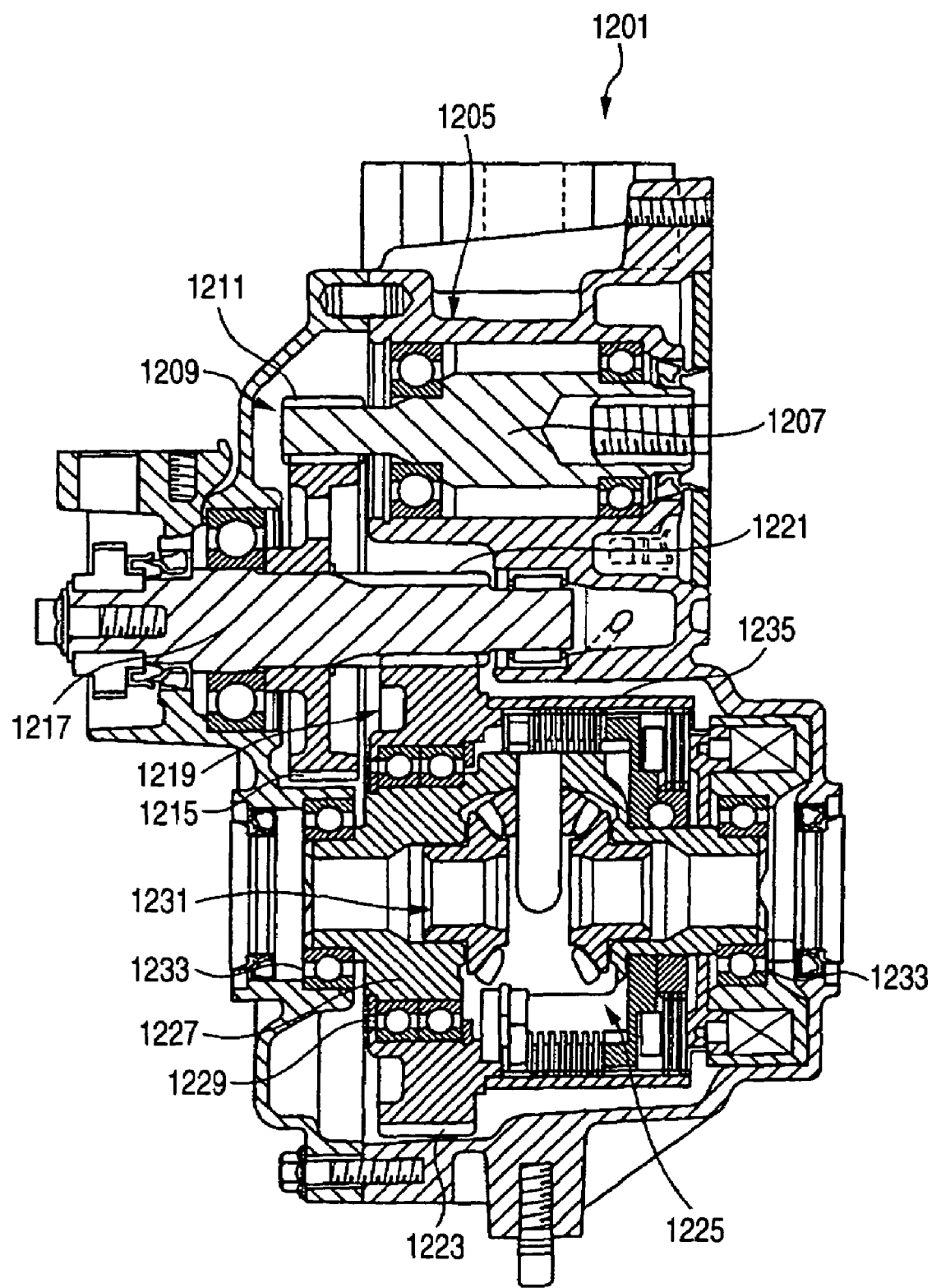
FIG. 14 is a cross sectional view of the motive power intermitting device according to a conventional art.
Figure 15:
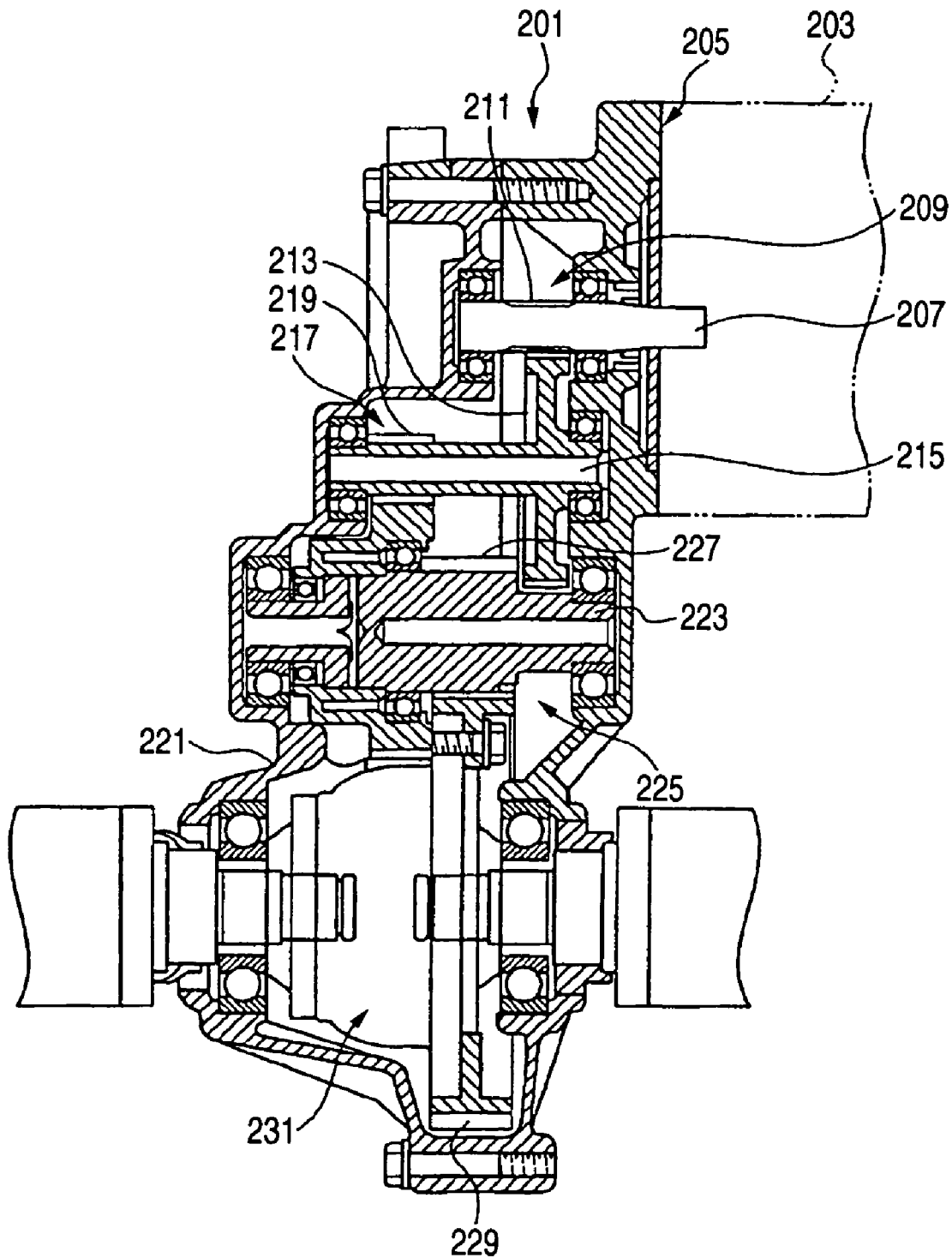
FIG. 15 is a cross sectional view of a reduction-drive device according to the other conventional art.
Figure 16:
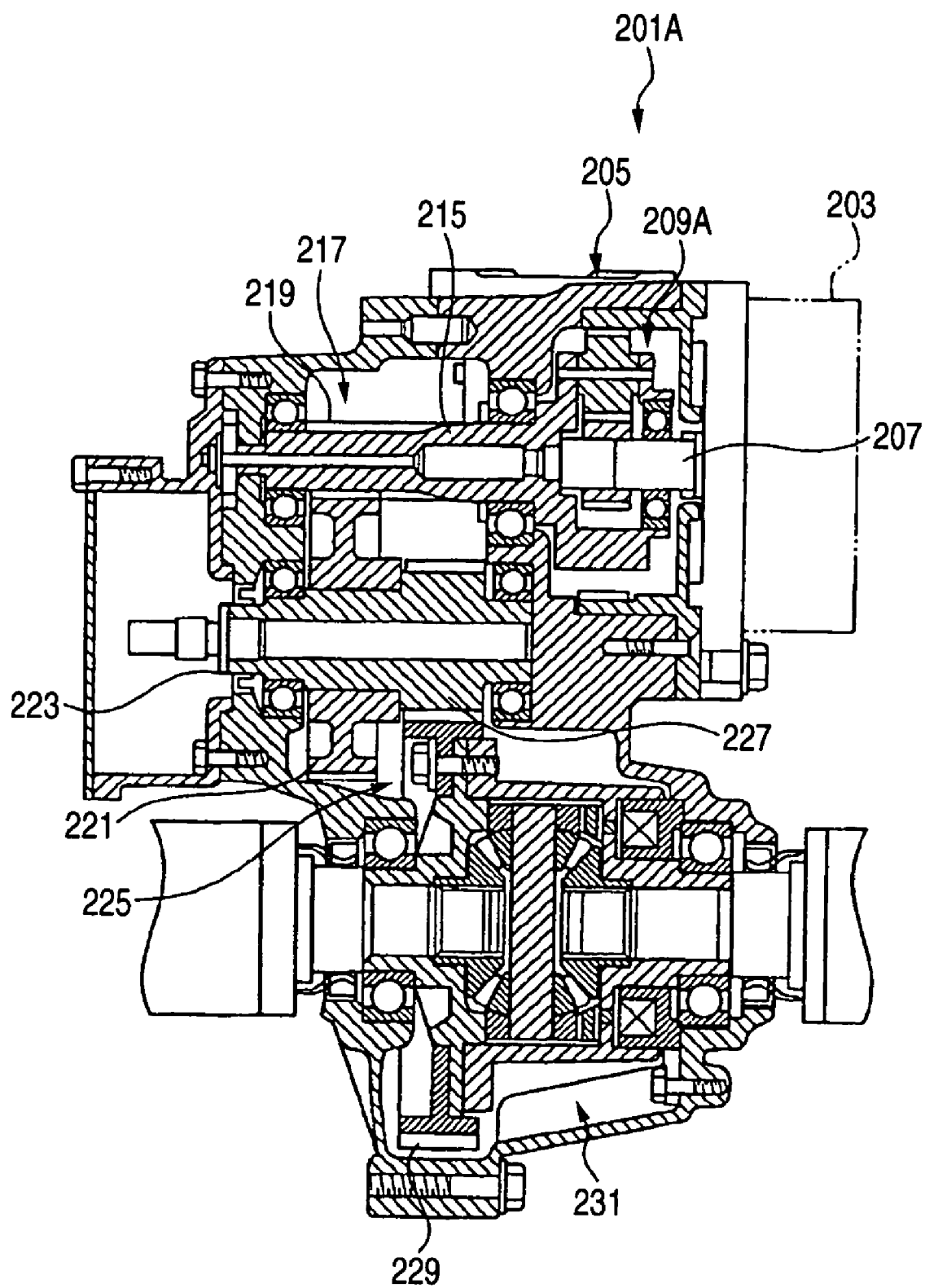
FIG. 16 is across sectional view of a power intermitting device according to the other conventional art.

FIG. 13 is a frame diagram of a reduction-drive device of a sixth embodiment. The reduction-drive device has a electric motor 3005 as a driving source, a housing 3041, a first reduction mechanism 3033, a second reduction mechanism 3035 and a distribution device 3037.

The motor 3005 includes a transmission shaft 3084 as an output shaft thereof, and fixed to the housing 3041 by bolts 3102.

The housing 3041 has a first housing 3043 disposed on a side of the first reduction mechanism 3033 and a second housing 3045 disposed on a side of the motor 3005. The first and the second housing 3043, 3045 are fixed by bolts 3101.

The first reduction mechanism 3033 includes a planet gear mechanism constituted of a sun gear 3069, planetary carrier 3063, a planetary gear 3065 and a ring gear 3067. The sun gear 3069 is integrally formed with the transmission shaft 3084, or is formed integrally rotatable with the transmission shaft 3084. One end of a rotational axis of the sun gear 3069 is rotatably supported on the first housing 3043. The planetary carrier 3063 is unrotatably fixed to the first housing 3043. The planetary gear 3065 is rotatably supported by the planetary corrier 3063, and is mesh with the sun gear 2069 and the ring gear 3067. The ring gear 3067 is rotatable relative to the first housing 3043. Further, an output shaft 3105 is provided integrally rotatable with the ring gear 3067, in an output side of the ring gear 3067. The output shaft 3105 is coaxially disposed with the transmission shaft 3084, and is outwardly disposed on the transmission shaft 3084. A reduction gear 3104 is integrally formed with the output shaft 3105, or is formed integrally rotatable with the output shaft 3105. Thereby, the reduction gear 3104 and the ring gear 3067 are integrally rotatable. The reduction gear 3104 may constituted of a pinion gear, in order to increase a reduction effect.

The distribution device 3037 comprises a gear 3038. The gear 3038 is mesh with the reduction gear 3104, so that the gear 3038 and the reduction gear 3104 constitute the second reduction mechanism 3035. The second reduction mechanism 3035 is disposed in a position between the motor 3005 and the first reduction mechanism in a direction of their axes. Clutches 3111, 3112 are provided on both sides of a rotational axis 3039 of the distribution device 3037. Axle shafts 3025, 3027 are provided on output sides of respective clutches 3111, 3112, and the clutches engage/disengage the rotational axis 3039 and the axle shafts 3025, 3027. Since clutches 3111, 3112 are respectively provided both right and left sides of the distribution device 3037, by independently controlling the right clutch 3112 and left clutch 3111, each right and left wheels (not shown) can be independently controlled.

An output from motor 3005 is transmitted to the sun gear 3069 via the transmission shaft 3084. By a rotation of the sun gear 3069, the planetary gear 3065 is rotated on its axis, then the ring gear 3067 is rotated. Thereby, the output is transmitted to the rotational shaft 3039 via a reduction gear 3104 and the distribution device 3037. Furthermore, this output is transmitted to the axle shafts 3025, 3027, according to the respective conditions of engagement/disengagement of the clutches 3111, 3112.

Further, in the above embodiments, a re-generating operation can be applied to the automobile, by using the motor as a generator. In the case of the re-generation operation, a torque input from the wheels are transmitted to the motor as the generator, via the axle shafts, the distribution device, the second reduction mechanism and the first reduction mechanism. If needed, the torque may also transmitted via the clutch(es) that is(are) coaxially disposed with any of rotational axes disposed between the wheels and the output shaft of the motor.

Further, in the above embodiment, a mechanism that engages and disengages torque's transmission, such like a two-ways clutch with a plurality of rollers or sprags as a sum members disposed between a pair of rotational members, a frictional clutch, electromagnetic clutch, a powder clutch, a magnetic fluidic clutch, and so on, is applied as the clutch (the clutch mechanism) for the reduction-drive device.

What is claimed is:

1. A reduction-drive device comprising:
a driving source including a transmission shaft;
a housing;
a first reduction mechanism supported by the housing, for reducing a driving force of the driving source, including:
a planetary carrier,
a planetary gear rotatably supported by the planetary carrier,
an internal gear in mesh with the planetary gear,
a sun gear in mesh with the planetary gear, and
wherein an output shaft of the first reduction mechanism is coaxially disposed with the transmission shaft and outer side of the transmission shaft;
a second reduction mechanism positioned between the driving source and the first reduction mechanism with respect to an axial direction of the transmission shaft, for reducing an output of the first reduction mechanism; and
a distribution device supported by the housing, for distributing an output of the second reduction mechanism to a pair of axle shafts.

2. The reduction-drive device according to claim 1, wherein the second reduction mechanism comprises:
a reduction gear provided on an output side of the first reduction mechanism, and
a ring gear provided on a side of the distribution device.

3. The reduction-drive device according to claim 2, wherein the reduction gear and the ring gear are brought in mesh at an inner position with respect to an outermost portion of the first reduction mechanism in a radial direction.

4. The reduction-drive device according to claim 1, wherein the transmission shaft is connected to the sun gear.

5. The reduction-drive device according to claim 1, wherein the driving source is an electric motor.

6. The reduction-drive device according to claim 1, wherein the driving source is mounted on an automobile having a main driving source for driving one of front and rear wheels, and a sub-driving source for driving the other of the front and rear wheels, and the driving source is the sub-driving source.

7. The reduction-drive device according to claim 6, wherein the main driving source is an internal combustion engine, and the sub-driving source is an electric motor.

8. The reduction-drive device according to claim 1, wherein the housing comprises at least a first housing including a first side wall and a second housing including a second side wall,
one side of the planetary carrier is supported by the first housing, and
the driving source is supported by the second housing.

9. The reduction-drive device according to claim 8, wherein the one side of the planetary carrier is rotatably supported by the first side wall via a bearing.

10. The reduction-drive device according to claim 9, wherein the other side of the planetary carrier is supported by the second housing.

11. The reduction-drive device according to claim 8, further comprising a carrier pin, wherein the planetary carrier is unrotatably supported by the first side wall via the carrier pin.

12. The reduction-drive device according to claim 1, wherein one of the sun gear and the transmission shaft is supported by the planetary carrier.

13. The reduction-drive device according to claim 1, further comprising a clutch mechanism provided in a transmission path from the transmission shaft to the axle shaft.

14. The reduction-drive device according to claim 13, the clutch mechanism is positioned between the second reduction mechanism and the axle shaft.

15. The reduction-drive device according to claim 13, wherein a axis of the clutch mechanism is disposed in parallel with the transmission shaft, and the clutch mechanism and the driving source are partially overlapped with respect to the axial direction.

16. The reduction-drive device according to claim 1, wherein the planetary carrier is relatively unrotatable with respect to the housing,
   the internal gear is relatively rotatable with respect to the housing, and
   the second reduction mechanism comprises:
      a reduction gear rotating together with the internal gear, and
      a ring gear, provided on a side of the distribution device, in mesh with the reduction gear.

17. The reduction-drive device according to claim 1, wherein the planetary gear comprises plural stepped gears including at least a gear in mesh with the sun gear, and a gear in mesh with the internal gear.

18. The reduction-drive device according to claim 1, wherein the planetary gear comprises a first stepped gear in mesh with the sun gear, and a second stepped gear in mesh with the internal gear.

19. The reduction-drive device according to claim 1, further comprising a clutch mechanism provided between the first reduction mechanism and the second reduction mechanism.

20. The reduction-drive device according to claim 1, further comprising a clutch mechanism provided between the distribution device and the axle shaft.

21. The reduction-drive device comprising:
   a driving source including a transmission shaft;
   a housing;
   a first reduction mechanism supported by the housing, for reducing a driving force of the driving source, including:
      a planetary carrier,
      a planetary gear rotatably supported by the planetary carrier,
      an internal gear in mesh with the planetary gear, and
      a sun gear in mesh with the planetary gear;
   a second reduction mechanism positioned between the driving source and the first reduction mechanism with respect to an axial direction of the transmission shaft, for reducing an output of the first reduction mechanism; and
   a distribution device supported by the housing, for distributing an output of the second reduction mechanism to a pair of axle shafts, and
   wherein the planetary carrier is relatively rotatable with respect to the housing,
   the internal gear is relatively unrotatable with respect to the housing, and
   the second reduction mechanism comprises:
      a reduction gear rotating together with the planetary carrier, and
      a ring gear, provided on a side of the distribution device, in mesh with the reduction gear.

22. The reduction-drive device comprising:
   a driving source including a transmission shaft;
   a housing;
   a first reduction mechanism supported by the housing, for reducing a driving force of the driving source, including:
      a planetary carrier,
      a planetary gear rotatably supported by the planetary carrier,
      an internal gear in mesh with the planetary gear, and
      a sun gear in mesh with the planetary gear;
   a second reduction mechanism positioned between the driving source and the first reduction mechanism with respect to an axial direction of the transmission shaft, for reducing an output of the first reduction mechanism; and
   a distribution device supported by the housing. for distributing an output of the second reduction mechanism to a pair of axle shafts, and
   wherein the second reduction mechanism comprises a pinion gear provided on an outer side of the first reduction mechanism and a ring gear provided on the distribution device.

* * * * *